US009563267B2

(12) United States Patent
Rekimoto

(10) Patent No.: US 9,563,267 B2
(45) Date of Patent: Feb. 7, 2017

(54) INFORMATION PROCESSING APPARATUS AND METHOD, INFORMATION PROCESSING SYSTEM, AND PROVIDING MEDIUM

(71) Applicant: Sony Corporation, Tokyo (JP)

(72) Inventor: Junichi Rekimoto, Tokyo (JP)

(73) Assignee: SONY CORPORATION, Tokyo (JP)

( * ) Notice: Subject to any disclaimer, the term of this patent is extended or adjusted under 35 U.S.C. 154(b) by 13 days.

(21) Appl. No.: 13/660,321

(22) Filed: Oct. 25, 2012

(65) Prior Publication Data
US 2013/0054420 A1 Feb. 28, 2013

Related U.S. Application Data

(63) Continuation of application No. 12/754,102, filed on Apr. 5, 2010, which is a continuation of application
(Continued)

(30) Foreign Application Priority Data

Oct. 19, 1998 (JP) .................................... 10-296501
Mar. 26, 1999 (JP) .................................... 11-084622

(51) Int. Cl.
G06F 3/00 (2006.01)
G06F 3/01 (2006.01)
(Continued)

(52) U.S. Cl.
CPC .............. *G06F 3/011* (2013.01); *G06F 3/002* (2013.01); *G06F 3/0481* (2013.01)

(58) Field of Classification Search
CPC .............. G06F 3/04842; G06F 3/04845; G06F 3/0481–3/0489
(Continued)

(56) References Cited

U.S. PATENT DOCUMENTS 4,654,482 A * 3/1987 DeAngelis ................. 379/93.12
4,970,666 A * 11/1990 Welsh et al. ................ 345/423
(Continued)

FOREIGN PATENT DOCUMENTS

JP 08-305995 11/1996
JP 09-330336 12/1997

OTHER PUBLICATIONS

Rekimoto et. al. "The world through the Computer: Computer Augmented Interaction with the Real World Environments" UIST 1995.*
Nagao et. al. "Agent Augmented Reality: A software agent meets the real world"; Proceedings of the Second International Conference on Multiagent Systems. 1996.*
Nagao, "Agent Augmented Reality: Integration of the Real World and Information Worlds via Software Agents", Journal of IPSJ, Apr. 15, 1997, pp. 257-266, vol. 38, No. 4.
(Continued)

*Primary Examiner* — Steven B Theriault
(74) *Attorney, Agent, or Firm* — K&L Gates LLP

(57) ABSTRACT

The invention enables users to virtually attach information to situations in the real world, and also enables users to quickly and easily find out desired information. An IR sensor receives an IR signal transmitted from an IR beacon, and supplies the received signal to a sub-notebook PC. A CCD video camera takes in a visual ID from an object, and supplies the inputted visual ID to the sub-notebook PC. A user inputs, through a microphone, a voice to be attached to situations in the real world. The sub-notebook PC transmits position data, object data and voice data, which have been supplied to it, to a server through a communication unit. The transmitted data is received by the server via a wireless LAN. The server stores the received voice data in a database in correspondence to the position data and the object data.

23 Claims, 30 Drawing Sheets

Related U.S. Application Data

No. 10/667,287, filed on Sep. 19, 2003, now Pat. No. 7,716,606, which is a continuation of application No. 09/413,432, filed on Oct. 6, 1999, now Pat. No. 6,636,249.

(51) Int. Cl.
*G06F 3/0481* (2013.01)
*G06F 3/048* (2013.01)

(58) Field of Classification Search
USPC .......................................................... 715/848
See application file for complete search history.

(56) References Cited

U.S. PATENT DOCUMENTS

| | | | |
|---|---|---|---|
| 4,982,346 A * | 1/1991 | Girouard et al. .......... 705/14.14 |
| 5,083,638 A | 1/1992 | Schneider |
| 5,267,042 A * | 11/1993 | Tsuchiya et al. .............. 348/239 |
| 5,296,884 A * | 3/1994 | Honda et al. .................. 396/311 |
| 5,335,072 A * | 8/1994 | Tanaka et al. .............. 348/231.3 |
| 5,340,968 A | 8/1994 | Watanabe et al. |
| 5,373,857 A * | 12/1994 | Travers et al. ................ 600/595 |
| 5,382,776 A * | 1/1995 | Arii et al. ....................... 235/375 |
| 5,416,730 A * | 5/1995 | Lookofsky ................ 361/679.09 |
| 5,424,524 A * | 6/1995 | Ruppert et al. ................. 705/17 |
| 5,444,618 A * | 8/1995 | Seki et al. ........................ 702/5 |
| 5,479,351 A * | 12/1995 | Woo et al. ....................... 352/12 |
| 5,506,644 A * | 4/1996 | Suzuki et al. .................. 396/319 |
| 5,528,518 A * | 6/1996 | Bradshaw et al. ............. 702/150 |
| 5,561,756 A * | 10/1996 | Miller et al. ................... 715/848 |
| 5,633,946 A * | 5/1997 | Lachinski et al. ............. 382/103 |
| 5,640,002 A * | 6/1997 | Ruppert et al. .......... 235/462.46 |
| 5,642,285 A * | 6/1997 | Woo et al. ...................... 701/470 |
| 5,648,768 A * | 7/1997 | Bouve ............................ 340/988 |
| 5,671,451 A * | 9/1997 | Takahashi et al. ............ 396/310 |
| 5,672,820 A * | 9/1997 | Rossi et al. .................. 73/178 R |
| 5,682,332 A * | 10/1997 | Ellenby et al. ................ 702/150 |
| 5,682,525 A * | 10/1997 | Bouve et al. |
| 5,686,902 A | 11/1997 | Reis et al. |
| 5,699,056 A * | 12/1997 | Yoshida ......................... 340/905 |
| 5,699,244 A * | 12/1997 | Clark et al. ........................ 702/2 |
| 5,721,679 A * | 2/1998 | Monson .......................... 701/50 |
| 5,742,521 A * | 4/1998 | Ellenby et al. ................ 702/127 |
| 5,751,576 A * | 5/1998 | Monson ........................... 700/83 |
| 5,765,176 A | 6/1998 | Bloomberg |
| 5,768,633 A * | 6/1998 | Allen et al. ........................ 396/2 |
| 5,768,640 A * | 6/1998 | Takahashi et al. ............ 396/310 |
| 5,774,876 A | 6/1998 | Wooley et al. |
| 5,781,195 A * | 7/1998 | Marvin .......................... 345/428 |
| 5,781,914 A * | 7/1998 | Stork et al. .................... 715/234 |
| 5,799,318 A | 8/1998 | Cardinal et al. |
| 5,815,411 A * | 9/1998 | Ellenby et al. ................ 702/150 |
| 5,819,032 A * | 10/1998 | de Vries et al. .............. 709/250 |
| 5,831,664 A * | 11/1998 | Wharton et al. ................ 725/81 |
| 5,839,094 A * | 11/1998 | French .......................... 702/91 |
| 5,852,810 A * | 12/1998 | Sotiroff et al. ............... 705/26.8 |
| 5,856,802 A | 1/1999 | Ura et al. |
| 5,859,628 A * | 1/1999 | Ross et al. ..................... 345/173 |
| 5,864,632 A * | 1/1999 | Ogawa et al. ................. 382/113 |
| 5,898,166 A * | 4/1999 | Fukuda et al. ................. 235/494 |
| 5,904,727 A * | 5/1999 | Prabhakaran .................. 701/454 |
| 5,905,248 A | 5/1999 | Russell et al. |
| 5,912,650 A * | 6/1999 | Carollo ............................. 345/7 |
| 5,926,116 A * | 7/1999 | Kitano et al. .................. 340/988 |
| 5,933,829 A | 8/1999 | Durst et al. |
| 5,945,976 A * | 8/1999 | Iwamura et al. .............. 345/419 |
| 5,946,678 A * | 8/1999 | Aalbersberg |
| 5,948,031 A | 9/1999 | Jinno et al. |
| 5,948,040 A * | 9/1999 | DeLorme et al. ............. 701/426 |
| 5,949,375 A | 9/1999 | Ishiguro et al. |
| 5,956,038 A | 9/1999 | Rekimoto |
| 5,971,589 A | 10/1999 | Hazama |
| 5,978,773 A * | 11/1999 | Hudetz et al. ................... 705/23 |
| 5,978,804 A * | 11/1999 | Dietzman |
| 5,978,816 A * | 11/1999 | Sakaguchi et al. ........... 715/207 |
| 5,979,757 A * | 11/1999 | Tracy et al. ................... 235/383 |
| 5,987,125 A * | 11/1999 | Stringer et al. ............... 713/150 |
| 6,002,345 A | 12/1999 | Ohmura et al. |
| 6,005,482 A | 12/1999 | Moran et al. |
| 6,008,727 A | 12/1999 | Want et al. |
| 6,016,494 A * | 1/2000 | Isensee et al. ................. 707/726 |
| 6,023,241 A * | 2/2000 | Clapper ................... 342/357.32 |
| 6,038,510 A | 3/2000 | lee |
| 6,047,234 A * | 4/2000 | Cherveny et al. ............. 701/451 |
| 6,058,428 A * | 5/2000 | Wang et al. ................... 709/232 |
| 6,061,064 A * | 5/2000 | Reichlen ................. G06F 3/011 345/418 |
| 6,064,749 A * | 5/2000 | Hirota et al. .................. 382/103 |
| 6,075,530 A * | 6/2000 | Lucas et al. ................... 715/804 |
| 6,083,353 A * | 7/2000 | Alexander, Jr. ............... 202/158 |
| 6,085,148 A | 7/2000 | Jamison et al. |
| 6,089,453 A * | 7/2000 | Kayser et al. ................. 235/383 |
| 6,091,956 A * | 7/2000 | Hollenberg ................. 455/456.5 |
| 6,094,625 A * | 7/2000 | Ralston ......................... 702/150 |
| 6,098,048 A * | 8/2000 | Dashefsky et al. ........... 705/7.32 |
| 6,098,082 A * | 8/2000 | Gibbon et al. ................ 715/202 |
| 6,101,483 A * | 8/2000 | Petrovich et al. .............. 705/21 |
| 6,115,611 A * | 9/2000 | Kimoto et al. ............. 455/456.3 |
| 6,122,520 A * | 9/2000 | Want et al. ................. 455/456.2 |
| 6,123,258 A | 9/2000 | Iida |
| 6,133,853 A * | 10/2000 | Obradovich et al. ......... 340/905 |
| 6,133,947 A * | 10/2000 | Mikuni ......................... 348/143 |
| 6,134,448 A | 10/2000 | Shoji et al. |
| 6,138,073 A | 10/2000 | Uchigaki |
| 6,144,848 A * | 11/2000 | Walsh et al. ................... 455/419 |
| 6,144,956 A * | 11/2000 | Yajima et al. |
| 6,148,261 A * | 11/2000 | Obradovich et al. ......... 701/438 |
| 6,148,331 A | 11/2000 | Parry |
| 6,173,239 B1 * | 1/2001 | Ellenby ......................... 702/150 |
| 6,175,343 B1 | 1/2001 | Mitchell et al. |
| 6,195,093 B1 | 2/2001 | Nelson et al. |
| 6,195,651 B1 * | 2/2001 | Handel et al. |
| 6,195,684 B1 | 2/2001 | Watanabe et al. |
| 6,198,394 B1 | 3/2001 | Jacobsen et al. |
| 6,202,023 B1 * | 3/2001 | Hancock et al. .............. 701/516 |
| 6,211,886 B1 * | 4/2001 | Yasuda et al. ................. 345/629 |
| 6,215,498 B1 * | 4/2001 | Filo et al. ...................... 345/419 |
| 6,219,694 B1 * | 4/2001 | Lazaridis et al. ............. 709/206 |
| 6,222,985 B1 * | 4/2001 | Miyake ......................... 386/224 |
| 6,243,591 B1 | 6/2001 | Takemura |
| 6,246,417 B1 * | 6/2001 | Kambe et al. ................. 345/619 |
| 6,249,241 B1 * | 6/2001 | Jordan et al. .................... 342/41 |
| 6,263,343 B1 * | 7/2001 | Hirono ........................... 707/770 |
| 6,282,362 B1 * | 8/2001 | Murphy et al. ............... 386/224 |
| 6,307,556 B1 | 10/2001 | Ellenby et al. |
| 6,317,718 B1 * | 11/2001 | Fano ........................... 705/14.39 |
| 6,321,091 B1 * | 11/2001 | Holland ..................... 455/414.2 |
| 6,326,946 B1 | 12/2001 | Moran et al. |
| 6,327,570 B1 * | 12/2001 | Stevens ......................... 705/7.29 |
| 6,339,709 B1 | 1/2002 | Gladwin et al. |
| 6,353,436 B1 * | 3/2002 | Reichlen ....................... 345/427 |
| 6,362,783 B1 | 3/2002 | Sugiura et al. |
| 6,385,454 B1 | 5/2002 | Bahl et al. |
| 6,397,184 B1 | 5/2002 | Walker |
| 6,437,797 B1 * | 8/2002 | Ota ................................ 345/638 |
| 6,466,232 B1 * | 10/2002 | Newell et al. ................. 715/700 |
| 6,484,196 B1 * | 11/2002 | Maurille ........................ 709/206 |
| 6,507,371 B1 * | 1/2003 | Hashimoto et al. .......... 348/552 |
| 6,532,021 B1 | 3/2003 | Tognazzini et al. |
| 6,532,230 B1 | 3/2003 | Lung et al. |
| 6,543,695 B1 * | 4/2003 | Swift et al. ............... 235/462.43 |
| 6,571,279 B1 * | 5/2003 | Herz et al. ..................... 709/217 |
| 6,608,549 B2 | 8/2003 | Mynatt et al. |
| 6,625,299 B1 * | 9/2003 | Meisner et al. ............... 382/103 |
| 6,625,315 B2 * | 9/2003 | Laumeyer et al. ............ 382/190 |
| 6,629,134 B2 | 9/2003 | Hayward et al. |
| 6,636,249 B1 * | 10/2003 | Rekimoto ...................... 715/849 |
| 6,731,612 B1 * | 5/2004 | Koss .............................. 370/310 |
| 6,732,120 B1 * | 5/2004 | Du ................................. 715/764 |
| 6,732,915 B1 | 5/2004 | Nelson et al. |
| 6,741,864 B2 * | 5/2004 | Wilcock et al. ............ 455/456.1 |
| 6,745,234 B1 * | 6/2004 | Philyaw et al. ............... 709/217 |
| 6,747,692 B2 * | 6/2004 | Patel et al. .................. 348/211.2 |

(56) References Cited

U.S. PATENT DOCUMENTS

| | | | |
|---|---|---|---|
| 6,879,942 B1 | 4/2005 | Nagase et al. | |
| 6,903,763 B1* | 6/2005 | Noguchi et al. | 348/207.99 |
| 6,941,239 B2 | 9/2005 | Unuma et al. | |
| 7,020,475 B2 | 3/2006 | Bahl et al. | |
| 7,032,001 B1 | 4/2006 | Herrod et al. | |
| 7,092,009 B2* | 8/2006 | Patel et al. | 348/207.1 |
| 7,149,957 B2* | 12/2006 | Hull et al. | 715/200 |
| 7,336,969 B2 | 2/2008 | Minnick et al. | |
| 7,526,718 B2* | 4/2009 | Samadani et al. | 715/201 |
| 2001/0004744 A1* | 6/2001 | Lazaridis et al. | 709/206 |
| 2001/0015756 A1* | 8/2001 | Wilcock et al. | 348/158 |
| 2001/0018698 A1* | 8/2001 | Uchino et al. | 707/533 |
| 2001/0036833 A1 | 11/2001 | Koshima | |
| 2001/0040984 A1* | 11/2001 | Kambe et al. | 382/113 |
| 2001/0043273 A1* | 11/2001 | Herrod et al. | 348/220 |
| 2002/0001032 A1* | 1/2002 | Ohki | 348/207 |
| 2002/0004753 A1* | 1/2002 | Perkowski | 705/26 |
| 2002/0163521 A1* | 11/2002 | Ellenby et al. | 345/502 |
| 2002/0167442 A1* | 11/2002 | Taylor | 342/357.09 |
| 2003/0004916 A1* | 1/2003 | Lewis | 707/1 |
| 2003/0093384 A1 | 5/2003 | Durst et al. | |
| 2005/0113945 A1 | 5/2005 | Engleson et al. | |

OTHER PUBLICATIONS

Japanese Office Action issued Jan. 29, 2013 for corresponding Japanese Appln. No. 2010-189580.

Nakamura et al., "One Examination of Generation and Management Method of Information in AR Environment", Information Processing Society of Japan, Jan. 29, 1998, pp. 31-36, vol. 98, No. 9.

Rekimoto, "Merge between Digital and Physical: User Interface Developed to Real World", Documents of 34th Intelligence Foundation Seminar (SIG-FAI-9802), Sep. 24, 1998, pp. 1-7.

Rekimoto, "Research Trend of Real-World Oriented Interface", Japan Society for Software Science and Technology, May 15, 1996, pp. 4-18, vol. 13, No. 3.

Japanese Office Action issued Oct. 30, 2012 for corresponding Japanese Appln. No. 2010-189580.

Japanese Office Action dated Jun. 7, 2011 for corresponding Application No. 2006-034289.

Feiner et al., "Knowledge-Based Augmented Reality", Communications of the ACM, vol. 36, No. 7, Jul. 1993, pp. 52-62.

Indo et al., "Deja vu—An Augmented reality system with mobile computer," NTT Human Interface Laboratories, IPSJ SIG Notes, vol. 96, pp. 15-20, 1996.

\* cited by examiner

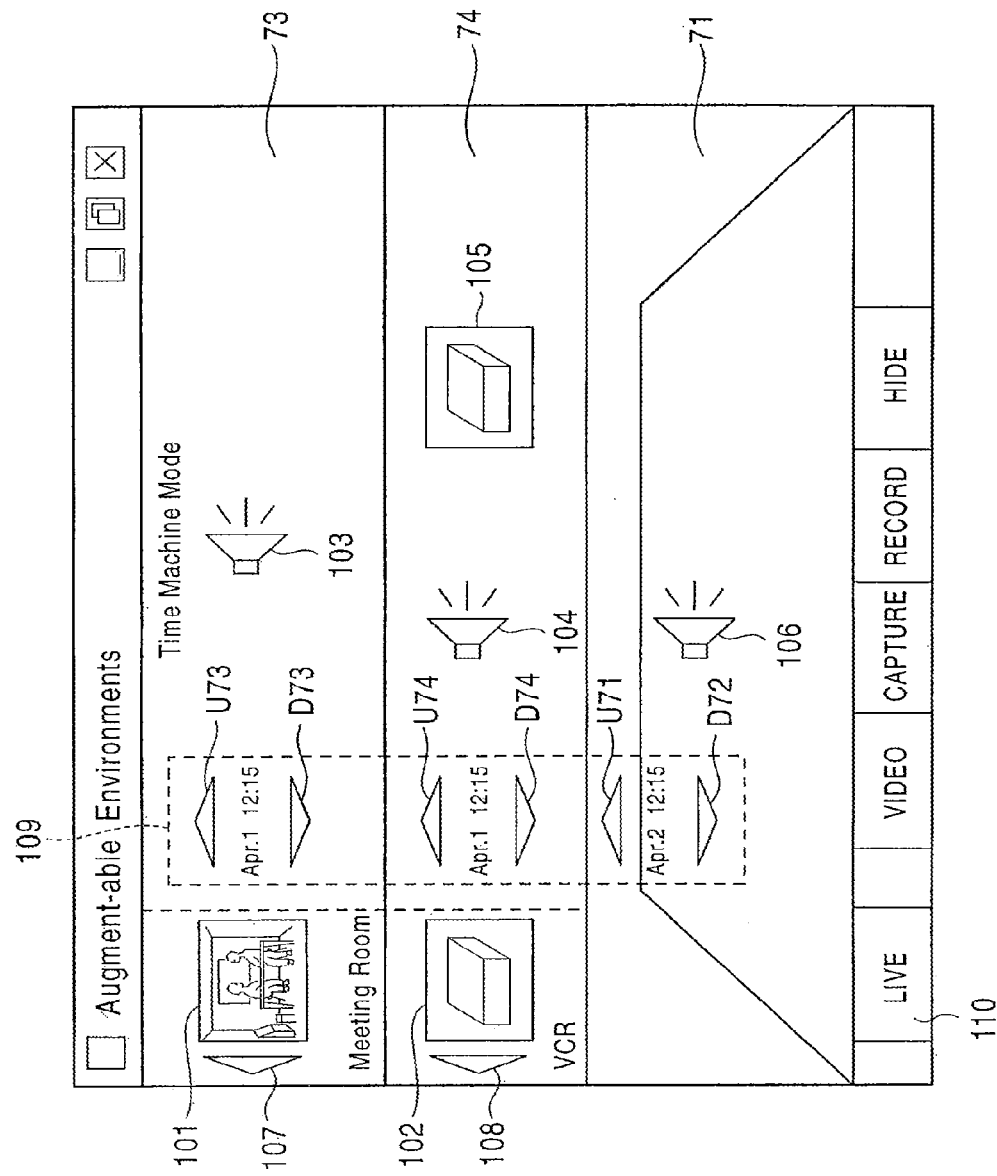

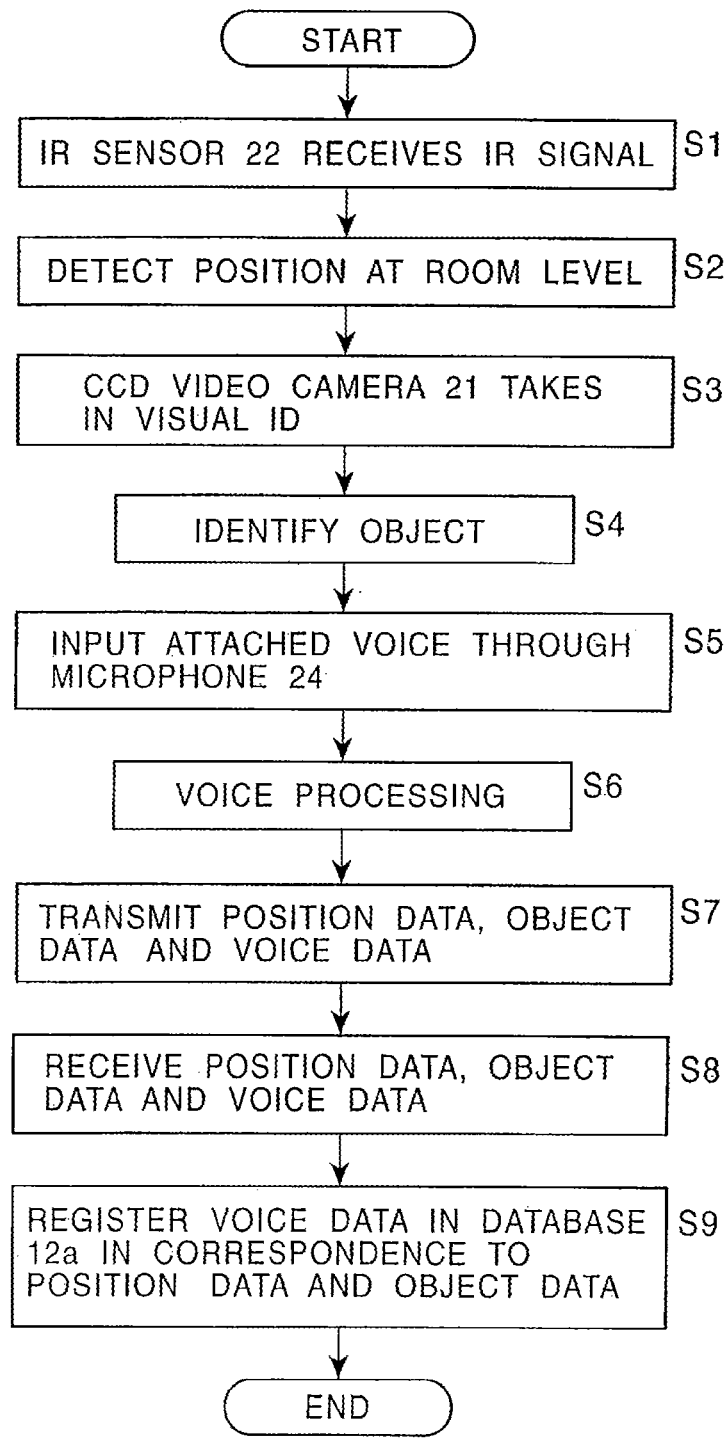

FIG. 12

TO : room3@ar.csl.sony.co.jp
Sbject :
Msg=Today's meeting is cancelled
Time=4/6/1988 10:00
Timeout=1 day

E-MAIL

INFORMATION PROCESSING APPARATUS AND METHOD, INFORMATION PROCESSING SYSTEM, AND PROVIDING MEDIUM

CROSS REFERENCES TO RELATED APPLICATIONS

The present application is a continuation of U.S. patent application Ser. No. 12/754,102, filed on Apr. 5, 2010, which is a continuation of U.S. patent application Ser. No. 10/667,287, filed on Sep. 19, 2003, which issued as U.S. Pat. No. 7,716,606 on May 11, 2010, which is a continuation of U.S. patent application Ser. No. 09/413,432, filed on Oct. 6, 1999, which issued as U.S. Pat. No. 6,636,249 on Oct. 21, 2003 which claims priority to Japanese Patent Application No. P11-084622, filed in the Japanese Patent Office on Mar. 26, 1999, and Japanese Patent Application No. P10-296501, filed in the Japanese Patent Office on Oct. 19, 1998, the entire contents of each of which are being incorporated by reference herein.

BACKGROUND

The present invention relates to an information processing apparatus and method, an information processing system, and a providing medium. More particularly, the present invention relates to an information processing apparatus and method, an information processing system, and a providing medium, which are adapted to attach various virtual information to real world environments or situations (such as a position and an object), and to present those various attached information.

Recently, systems and interfaces called Augmented Reality (abbreviated as AR hereinafter) have been proposed. "Augmented Reality" is a generic term for systems and interfaces based on the concept of providing information, which corresponds to situations in the real world such as a position and an object, to users and offering a more comfortable interface for the real world to the users.

FIG. 30 shows the concept of AR. As shown in FIG. 30, a user terminal, e.g., a computer that the user can wear on himself or herself (referred to as a wearable computer 122 hereinafter), is always held in an ON-state to observe real world environments 121 and to present appropriate information to the user as required.

A sensor 123 includes, e.g., an IR (infrared) sensor, a CCD (Charge Coupled Device) video camera and a microphone to take in information (position information, ID information, voice information, etc.) of the real world environments 121. The information taken in by the sensor 123 is supplied to a server 125 via a network. The server 125 reads data, which corresponds to the supplied information of the real world, from an internal database 125a in which data corresponding to the information of the real world is stored beforehand, and renders the read data to be displayed on an HUD (Head Up Display) 124 via a network. With such a system, the user can acquire the data corresponding to the situations in the real world environments 121.

One example of such an AR system is reported by Steven Feiner, Blair MacIntyre, and Doree Seligmann, "Knowledge-based augmented reality," Communication of the ACM, Vol. 36, No. 7, pp. 52-62, August 1993. This AR system is a maintenance system for a laser beam printer. Assist information produced based on position information, which is obtained by a ultrasonic sensor, is indicated on a transmission type wearable display mounted on the user's head.

Apart from the above-described AR system, there are known systems allowing users to exchange various information about things in the real world or various information in the virtual world via a network or the like. For example, information exchange service systems called an on-line bulletin board system (BBS) and chat over the Internet have been already utilized. With one of personal computer (PC) communication services, a bulletin board (forum) or the like subdivided depending upon favorable items of users is provided so that the users can exchange information via the bulletin board. This form of service often plays a predominant role in the user community. The BBS is usually utilized in such a manner that the user retrieves an interesting bulletin board through a search service based on the name of the bulletin board, etc., and then browses information written on the retrieved bulletin board or writes new information on it.

However, the conventional AR system described above is problematic in that the assist information displayed on the HUD or the like is limited to the information previously registered in a database stored in a computer, and such information (annotation) as popping into the user's head during maintenance work cannot be newly added to the database. Specifically, the above-described AR system is only able to read information corresponding to situations in the real world from among the information previously stored in the database, and to present the read information to users. In other words, the conventional AR system has been merely a context-aware browser.

When users receive the information exchange services such as the BBS and chat over the Internet or PC communication, the users face such a problem that they have to retrieve, e.g., interesting bulletin boards through a search service based on the name of each bulletin board, etc. However, a large number of bulletin boards, etc. exist on the Internet, and it is not always easy to quickly find out a desired one of those bulletin boards, etc. on which desired information is written.

SUMMARY

In view of the state of art set forth above, an object of the present invention is to provide an information processing apparatus and method, an information processing system, and a providing medium, with which information (such as image information, text information and voice information) corresponding to situations (such as a position and an object) in the real world can be presented to users, while users can attach, to situations in the real world, information corresponding to the situations in the real world, and with which users can quickly and easily find out desired information.

The above object of the present invention is achieved by an information processing apparatus for communicating with another information processing apparatus, wherein the apparatus includes a specific information input unit for taking in specific information to specify situations in the real world; an attached information input unit for taking in attached information to be attached to the situations in the real world specified by the specific information that is taken in by the specific information input unit; a transmitting unit for transmitting the attached information and the specific information; a receiving unit for receiving the attached information transmitted from the another information processing apparatus corresponding to the transmitted specific information; and a presenting unit for presenting, as information related to the specified situations in the real world, the attached information having been received.

Also, the above object of the present invention is achieved by an information processing method implemented in an information processing apparatus for communicating with another information processing apparatus, wherein the method includes a specific information input step of taking in specific information to specify situations in the real world; an attached information taking-in step of taking in attached information to be attached to the situations in the real world specified by the specific information; a transmitting step of transmitting the attached information and the specific information; a receiving step of receiving the attached information transmitted from the another information processing apparatus corresponding to the specific information transmitted in the transmitting step; and a presenting step of presenting, as information related to the specified situations in the real world, the attached information having been received.

Further, the above object of the present invention is achieved by an information processing apparatus for communicating with another information processing apparatus, wherein the apparatus includes a receiving unit for receiving specific information to specify situations in the real world and attached information attached to the situations in the real world specified by the specific information, the specific information and the attached information being both transmitted from the another information processing apparatus; a storage unit for storing the received specific information and attached information; a reading unit for reading the attached information corresponding to the specific information from the storage unit; and a transmitting unit for transmitting the attached information having been read.

Still further, the above object of the present invention is achieved by an information processing method implemented in an information processing apparatus for communicating with another information processing apparatus, wherein the method includes a receiving step of receiving specific information to specify situations in the real world and attached information attached to the situations in the real world specified by the specific information, the specific information and the attached information being both transmitted from the another information processing apparatus; a storing step of storing the received specific information and attached information; a reading step of reading the attached information corresponding to the specific information stored in the storing step; and a transmitting step of transmitting the attached information having been read.

Still further, the above object of the present invention is achieved by an information processing system including at least a first information processing apparatus including a specific information taking-in unit for input specific information to specify situations in the real world, an attached information input unit for taking in attached information to be attached to the situations in the real world specified by the specific information, a transmitting unit for transmitting the attached information and the specific information, a receiving unit for receiving the attached information transmitted from a second information processing apparatus corresponding to the transmitted specific information, and a presenting unit for presenting, as information related to the specified situations in the real world, the attached information having been received; and a second information processing apparatus including a receiving unit for receiving the specific information and the attached information both transmitted from the first information processing apparatus, a storage unit for storing the received specific information and attached information, a reading unit for reading the attached information corresponding to the specific information from the storage unit, and a transmitting unit for transmitting the attached information read by the reading unit; the first information processing apparatus and the second information processing apparatus being connected via a network.

Still further, the above object of the present invention is achieved by a providing medium for providing a computer-readable program to execute a processes including the steps of a specific information input step of taking in specific information to specify situations in the real world; an attached information input step of taking in attached information to be attached to the situations in the real world specified by the specific information; a transmitting step of transmitting the attached information and the specific information; a receiving step of receiving the attached information transmitted from the another information processing apparatus corresponding to the transmitted specific information; and a presenting step of presenting, as information related to the specified situations in the real world, the attached information having been received.

Still further, the above object of the present invention is achieved by a providing medium for providing a computer-readable program to execute a process including the steps of a receiving step of receiving specific information to specify situations in the real world and attached information attached to the situations in the real world specified by the specific information, the specific information and the attached information being both transmitted from the another information processing apparatus; a storing step of storing the received specific information and attached information; a reading step of reading the attached information corresponding to the specific information stored in the storing step; and a transmitting step of transmitting the attached information having been read.

In the present invention, the specific information includes at least one of image information of the real world, position information of the real world, and object information of the real world. Also, the situation in the real world is an object in the real world, the specific information is an ID attached to the object in the real world, and the attached information transmitted from the transmitting unit is information that is related to the object in the real world and can be browsed and exchanged. Further, the situation in the real world is a position in the real world, the specific information is position information of the real world, and the attached information transmitted from the transmitting unit is information that is related to the position in the real world and can be browsed and exchanged.

Additional features and advantages are described herein, and will be apparent from the following Detailed Description and the figures.

BRIEF DESCRIPTION OF THE FIGURES

FIG. 8 is a representation for explaining a time machine mode.

FIG. 9 is a flowchart for explaining the process of producing information to be attached to situations in the real world and registering the information in a database in the Augment-able Reality system.

FIG. 12 is a representation showing one example of E-mail transmitted from a computer (42) in FIG. 3.

DETAILED DESCRIPTION

Preferred embodiments of the present invention will be described with reference to the drawings.

Figure 1:
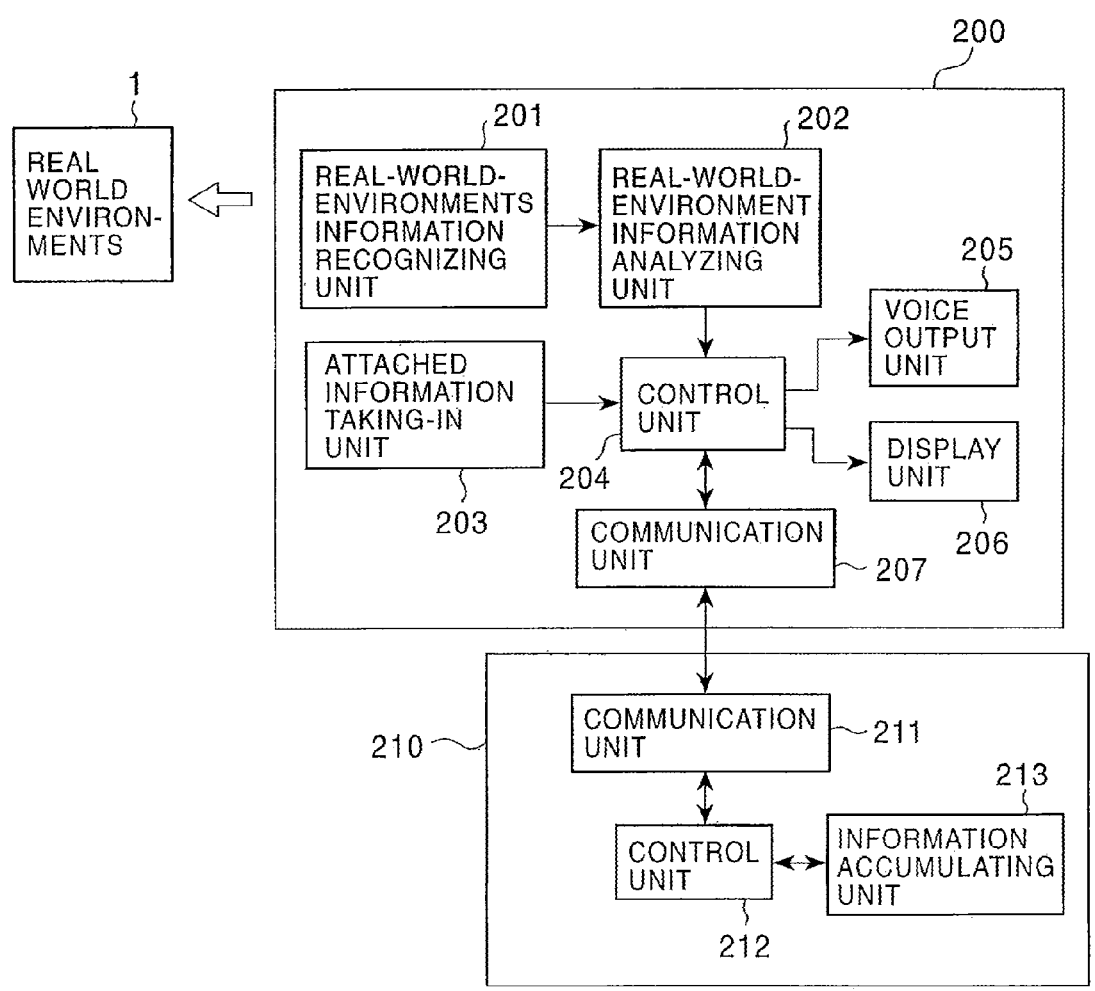
FIG. 1 is a block diagram showing a schematic entire configuration of an information processing system of the present invention.

FIG. 1 shows an entire configuration of one working mode of the present invention in which an information processing apparatus and method, an information processing system, and a providing medium are embodied according to the present invention.

Referring to FIG. 1, a first information processing apparatus (which is primarily used by users and is referred to as a user terminal 200 hereinafter) is shown, which includes a real-world-environment information recognizing unit 201 which serves as specific information input unit means for taking in specific information to specify situations (context information such as information regarding an object image, an object ID, a position and a voice) in the real world environments 1; a real-world-environment information analyzing unit 202 for analyzing the information taken in by the real-world-environment information recognizing unit 201; an attached information input unit 203 for taking in attached information to be attached to situations (such as an object and a position) in the real world; a communication unit 207 for communicating information between the user terminal 200 and a second information processing apparatus, for example, (which is primarily installed on the service providing side and is referred to as a server 210 hereinafter); and a control unit 204 for receiving desired information from the server 210 based on the information analyzed by the real-world-environment information analyzing unit 202, and for producing a video signal, a voice signal, etc., based on the desired information. The user terminal 200 further includes a display unit 206 for displaying the video signal from the control unit 204 on a screen, and a voice output unit 205 for outputting the voice signal from the control unit 204. Additionally, the functions of the user terminal 200 in this working mode may be implemented in the form of hardware or software.

Furthermore, in this working mode of the present invention, the server 210 includes an information accumulating unit 213 for storing the specific information to specify situations in the real world and the attached information attached to the situations in the real world which are specified by the specific information, both types of the information being transmitted from the user terminal 200; a communication unit 211 for receiving the specific information and the attached information transmitted from the user terminal 200, and for transmitting, to the user terminal 200, the attached information read from the information accumulating unit 213 corresponding to the specific information;

and a control unit 212 for controlling processes of storing and reading information in and from the information accumulating unit 213 and processes of transmitting and receiving data to and from the communication unit 211. Additionally, the functions of the server 210 in this working mode may be implemented in the form of hardware or software.

In this working mode of the present invention, the user terminal 200 and the server 210 are connected to each other via a network, for example, to construct an information processing system (network system).

As a more concrete form, a first embodiment of the network shown in FIG. 1 will be described below with reference to FIGS. 2 to 12.

Figure 3:
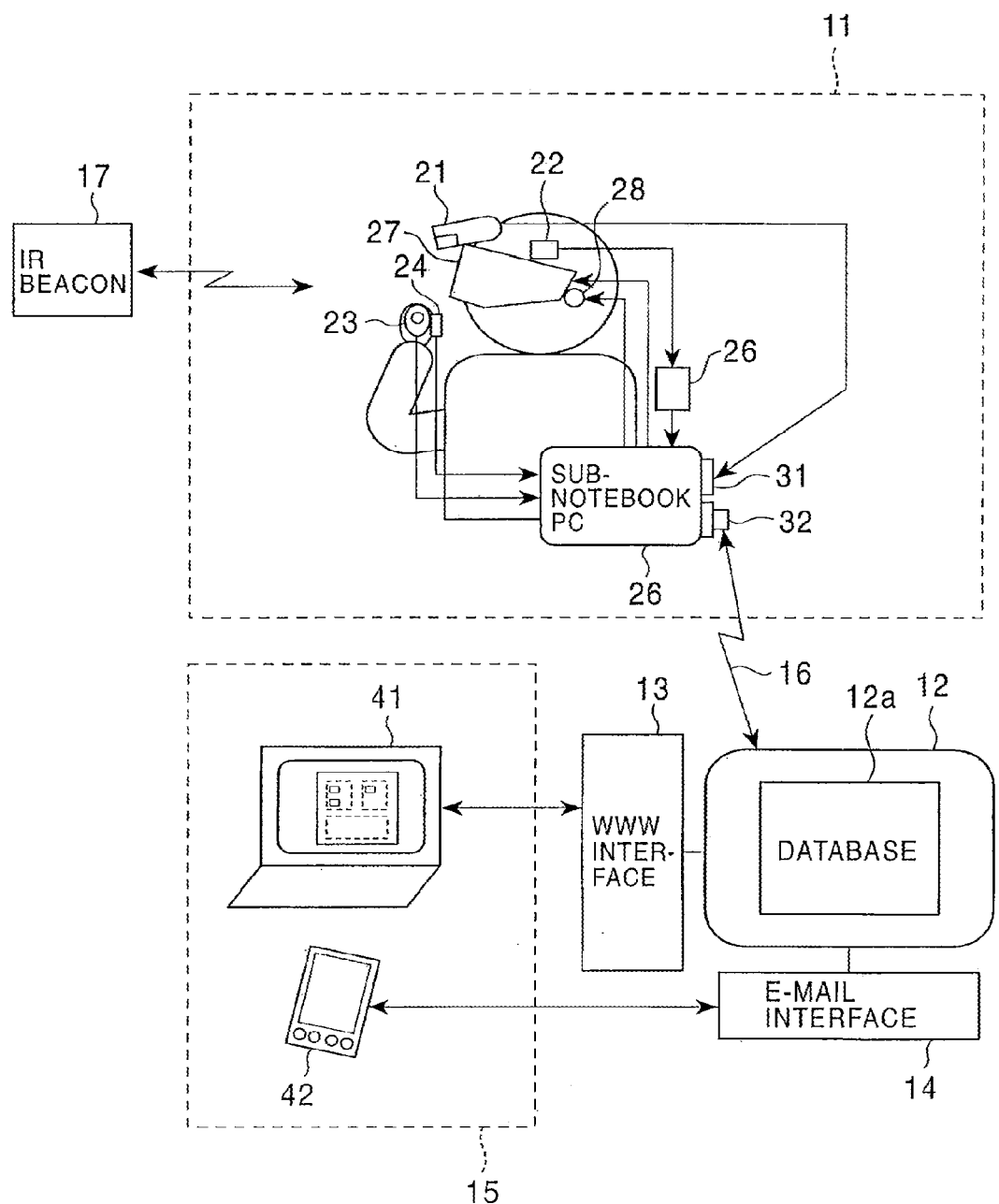
FIG. 3 is a block diagram showing a configuration of one example of an Augment-able Reality system according to the first embodiment of the present invention.
Figure 4A:
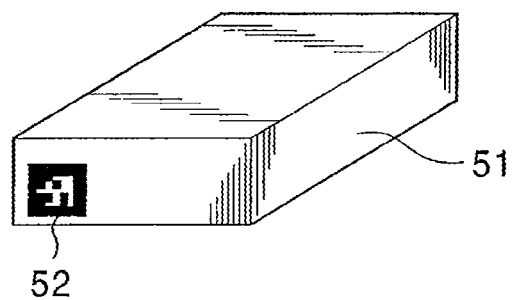
FIGS. 4A and 4B are representations for explaining a visual ID.
Figure 4B:
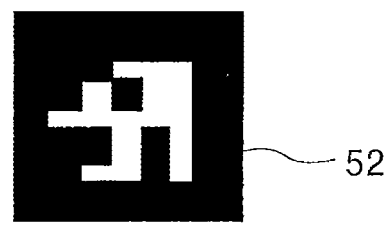
Figure 5:
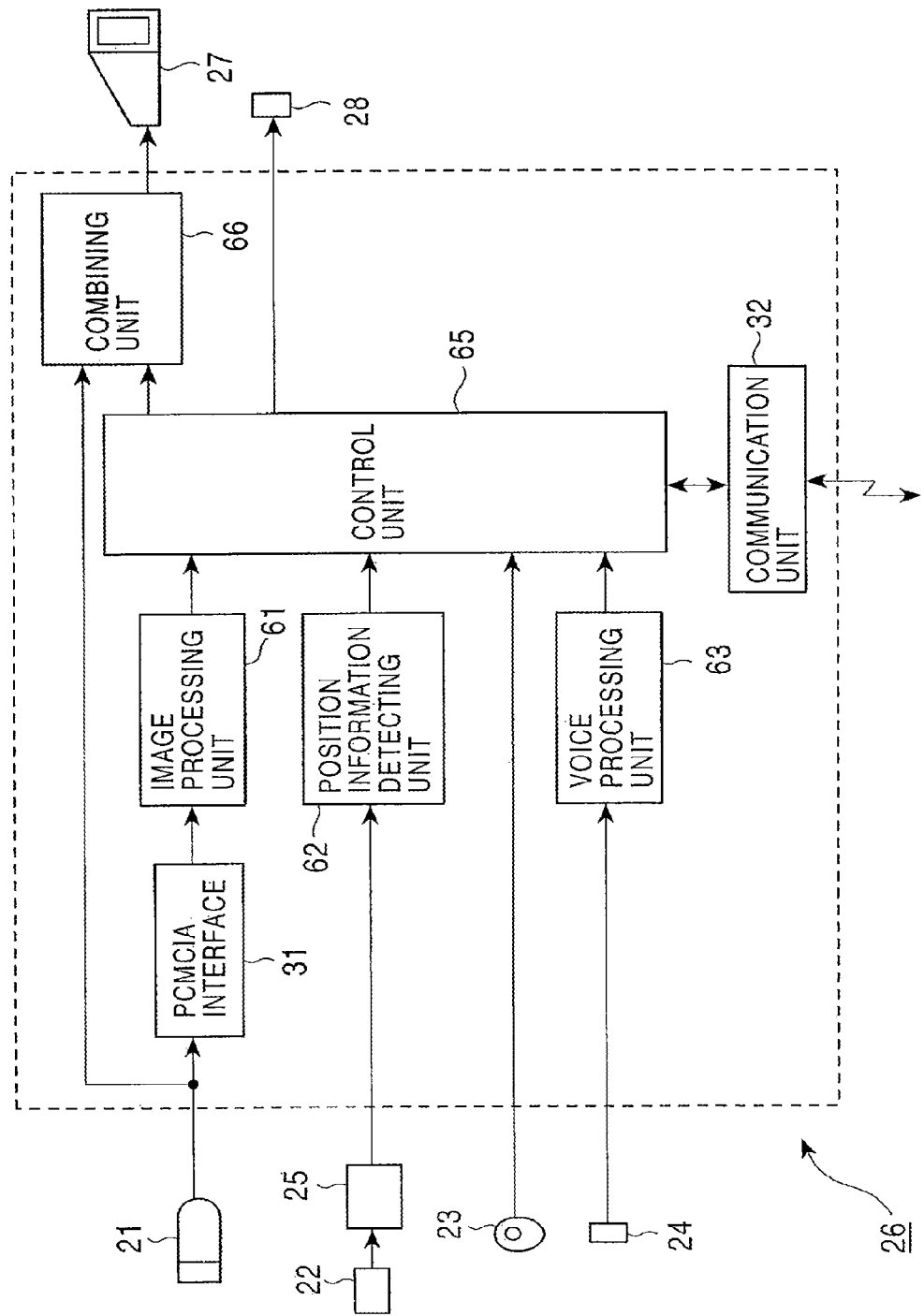
FIG. 5 is a block circuit diagram showing one example of configuration of a sub-notebook PC in FIG. 2.
Figure 10:
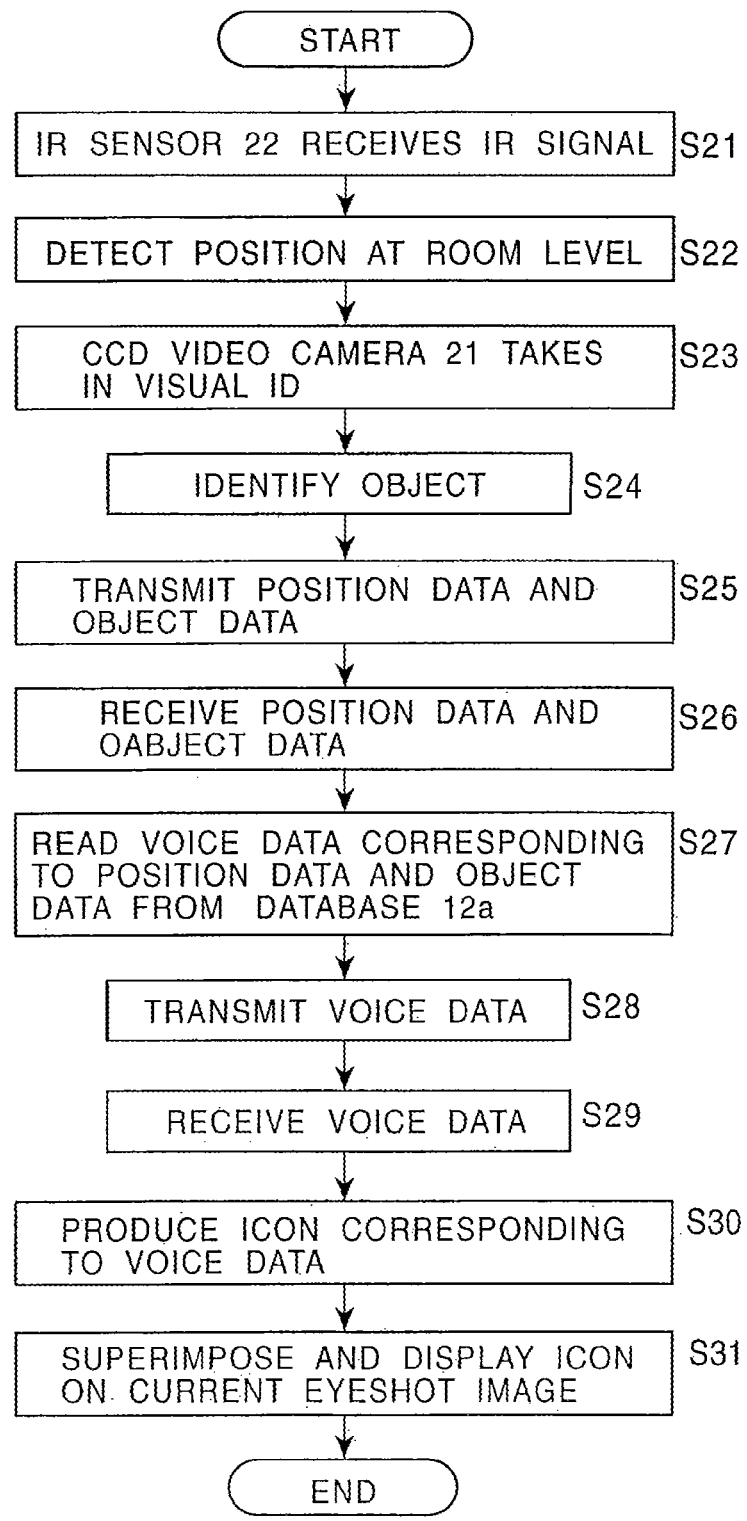
FIG. 10 is a flowchart for explaining the process of reading and displaying the information, which has been attached to situations in the real world, from the database.

An information processing apparatus (e.g., a user terminal) according to the first embodiment of the present invention is an information processing apparatus for communicating with another information processing apparatus (e.g., a server), and mainly includes a CCD video camera 21, shown in FIG. 3, as one example of an image input unit for taking in an image of the real world; an IR sensor 22, shown in FIG. 3, as one example of a position detecting unit for detecting a position in the real world; an image processing unit 61, shown in FIG. 5, as one example of an object identifying unit for identifying an object in the real world; a microphone 24, shown in FIG. 3, as one example of an attached information input unit for taking in attached information, which is to be attached to the real world, corresponding to the position information outputted from the position detecting unit or the object information outputted from the object identifying unit; a step S7, shown in FIG. 9, as one example of transmitting unit for transmitting the attached information taken in by the attached information input unit, the position information and the object information; a step S29, shown in FIG. 10, as one example of a receiving unit for receiving, from the another information processing apparatus, the attached information transmitted from the transmitting unit and corresponding to the position information and the object information; and a step S31, shown in FIG. 10, as one example of a display control unit for controlling display of an image produced by combining the attached information received by the receiving unit and the image information taken in by the image input unit.

Also, an information processing apparatus (e.g., a server) according to the first embodiment of the present invention includes a step S8, shown in FIG. 9, as one example of a receiving unit for receiving the attached information to be attached to the real world, the position information representing a position in the real world, and the object information for identifying an object in the real world, these three types of information being transmitted from another information processing apparatus (e.g., a user terminal); a database 12a, shown in FIG. 3, as one example of a storage unit for storing the attached information received by the receiving unit in correspondence to the position information and the object information; a step S27, shown in FIG. 10, as one example of a reading unit for reading, from the storage unit, the attached information corresponding to the position information and the object information; and a step S28, shown in FIG. 10, as one example of a transmitting unit for transmitting the attached information read by the reading unit.

Figure 2:
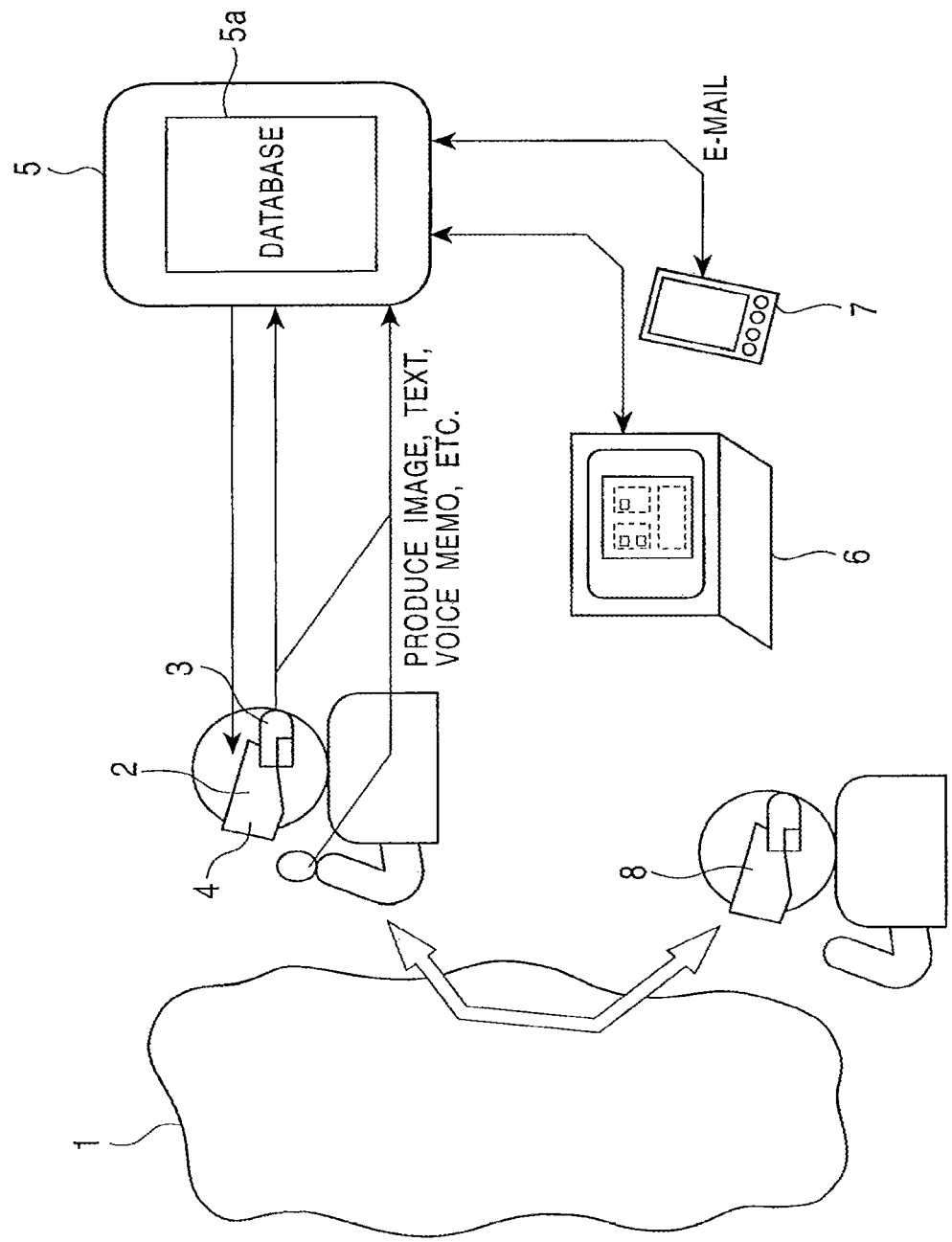
FIG. 2 is an illustration for explaining the concept of Augment-able Reality according to a first embodiment of the present invention.

An AR system according to the first embodiment of the present invention differs from the conventional AR system in that information flows bidirectionally and is not merely "augmented." In view of the above meaning, the present AR system is referred to as an Augment-able Reality system hereinafter. Also, in the following description, conventional desktop, laptop, and notebook computers are collectively referred to as normal computers for the purpose of clear distinction from wearable computers. FIG. 2 illustrates the concept of Augment-able Reality according to the first embodiment of the present invention. In the first embodiment, a wearable computer 2 that the user can wear on himself or herself is employed as one example of a user terminal. Of course, the user terminal may be, e.g., a portable computer instead of a wearable computer. The wearable computer 2 is always held in an ON-state to observe situations in the real world environments 1 and to present appropriate information to the user as required.

A sensor 3 includes, e.g., an IR (infrared) sensor, a CCD video camera and a microphone to take in context information (position information, ID information, voice information, etc.) of the real world environments 1. The context information taken in by the sensor 3 is supplied to a server 5 via a network. The server 5 reads data, which corresponds to the supplied context information, from an internal database 5a in which data corresponding to the context information is stored beforehand, and renders the read data corresponding to the supplied context information to be supplied to and displayed on an HUD 4 via a network. With such a system, the user having the wearable computer 2 put on himself or herself can acquire the data corresponding to the situations in the real world environments 1.

Also, the user having the wearable computer 2 put on himself or herself creates, with the aid of the sensor 3, image data, text data, voice data, etc. which are to be attached (or affixed) to the situations in the real world environments 1. The attached data thus created is supplied to the server 5 via the network. The server 5 stores the supplied attached data in the database 5a in correspondence to the context information of the real world environments 1. The server 5 also renders the attached data, which has been newly stored in the database, to be displayed on the HUD 4 via the network as required.

When another user having a wearable computer 8 put on himself or herself is in the same situation as the user having the wearable computer 2 put on himself or herself, the server 5 presents via the network the data corresponding to the situation to the other user having the wearable computer 8 as well.

The information corresponding to the situations in the real world can also be attached and browsed from normal computer environments. For example, when the user having the wearable computer 2 attaches information to a certain room, the attached information can be accessed from a normal computer 6 through, e.g., a map on the Web. When another user transmits an E-mail addressed to a "meeting room A" from a normal computer 7, the server 5 stores the received E-mail in the internal database 5a. Then, when the user having the wearable computer 2 comes to the "meeting room A," the contents of the E-mail sent to the "meeting room A" are given to that user.

A configuration of the Augment-able Reality system according to the first embodiment will be described below with reference to FIG. 3. It is assumed that the Augment-able Reality system shown in FIG. 3 is installed in a building.

A wearable unit 11 mainly includes the CCD video camera 21, the IR sensor 22, a mouse 23, the microphone 24, an interface box 25, a sub-notebook PC (Personal Computer) 26, an HUD 27, and an earphone 28 which are all carried with the user. The wearable unit 11 (the sub-notebook PC 26) is connected to a server 12 via a wireless LAN (Local Area Network) 16. The server 12 includes the database 12a therein. A normal computer 41 is connected to the server 12 via a WWW (World Wide Web) interface 13. A normal computer 42 is connected to the server 12 via an E-mail interface 14.

The Augment-able Reality system shown in FIG. 3 employs, e.g., both an IR beacon 17 and a visual ID for recognizing situations (such as a position and an object) in the real world. The IR beacon 17 is installed in each room of the building, and transmits an IR signal at intervals of predetermined time. This IR signal enables a position recognition to be made at a room level. Also, recognition at an object level can be made by pasting a visual ID 52, which is formed by printing, e.g., a two-dimensional bar code (so-called cybercode) shown in FIG. 4B, onto an object such as a video cassette recorder (VCR) 51 shown in FIG. 4A.

The CCD video camera 21 takes in an image of the real world. The CCD video camera 21 also takes in two-dimensional bar code data of the visual ID 52 pasted onto the object 51. The image data and the two-dimensional bar code data of the visual ID 52 thus taken in are supplied to the sub-notebook PC 26 via a PCMCIA (Personal Computer Memory Card International Association) interface 31.

The IR sensor 22 receives the IR signal transmitted from the IR beacon 17, and then supplies the received signal to the sub-notebook PC 26 via the interface box 25.

The user operates the mouse 23 to input information to the sub-notebook PC 26. Also, when the user inputs a voice through the microphone 24, the inputted voice data is supplied to the sub-notebook PC 26.

The sub-notebook PC 26 will be described in more detail with reference to FIG. 5.

The image data and the two-dimensional bar code data taken in by the CCD video camera 21 are supplied to the image processing unit 61 via the PCMCIA interface 31. The image processing unit 61 executes a predetermined process on the supplied image data, and supplies the processed image data to a control unit 65. Further, the image processing unit 61 recognizes the supplied two-dimensional bar code data, identifies the object 51, and supplies the object data to the control unit 65.

The signal received by the IR sensor 22 is supplied to a position information detecting unit 62 via the interface box 25. The position information detecting unit 62 detects the position of a room (identifies a room) based on the supplied signal, and supplies the detected position data to the control unit 65.

The data inputted through the mouse 23 is supplied to the control unit 65. The voice data inputted through the microphone 24 is supplied to a voice processing unit 63. The voice processing unit 63 executes a predetermined process on the supplied voice data, and supplies the processed voice data to the control unit 65.

The control unit 65 transmits the supplied position data, object data, image data and voice data to the server 12 via a communication unit 32. The transmitted data is received via the wireless LAN 16 by a communication unit (not shown) incorporated into the server 12. A combining unit 66 combines an output of the CCD video camera 21 and an output of the control unit 65 with each other, and supplies the combined output to the HUD 27 for display on it.

The server 12 stores the received image data and voice data in the database 12a in correspondence to the position information and the object information.

The process of reading the information attached to the situations of the real world in the first embodiment will be explained below.

When the position data and the object data are supplied respectively from the position information detecting unit 62 and the image processing unit 61, the control unit 65 transmits the position data and the object data to the server 12 through the communication unit 32. The transmitted position data and object data are received via the wireless LAN 16 by the communication unit incorporated in the server 12.

The server 12 reads, from the database 12a, the image data and the voice data corresponding to the transmitted position data and object data. The read image data and voice data are transmitted to the sub-notebook PC 26 via the communication unit.

The transmitted image data and voice data are received by the communication unit 32 of the sub-notebook PC 26 via the wireless LAN 16. The communication unit 32 supplies the received image data and voice data to the control unit 65. The control unit 65 creates icons corresponding to the supplied image data and voice data, respectively, and supplies the created icons to the combining unit 66. The control unit 65 also outputs the supplied voice data through the earphone 28. The combining unit 66 combines the corresponding icon with the supplied image data of the current sight, followed by displaying a combined image on the HUD 27. As a result, the user having the wearable unit 11 put on himself or herself can acquire information corresponding to the situations of the real world.

One example of a display screen image on the HUD 27 will be described below with reference to FIG. 6. The following example of a display screen image represents the case that the user operates a VCR (object) at a location of an editing studio and pastes, as a voice memo, a point found out by the user about the VCR (object).

Figure 6:
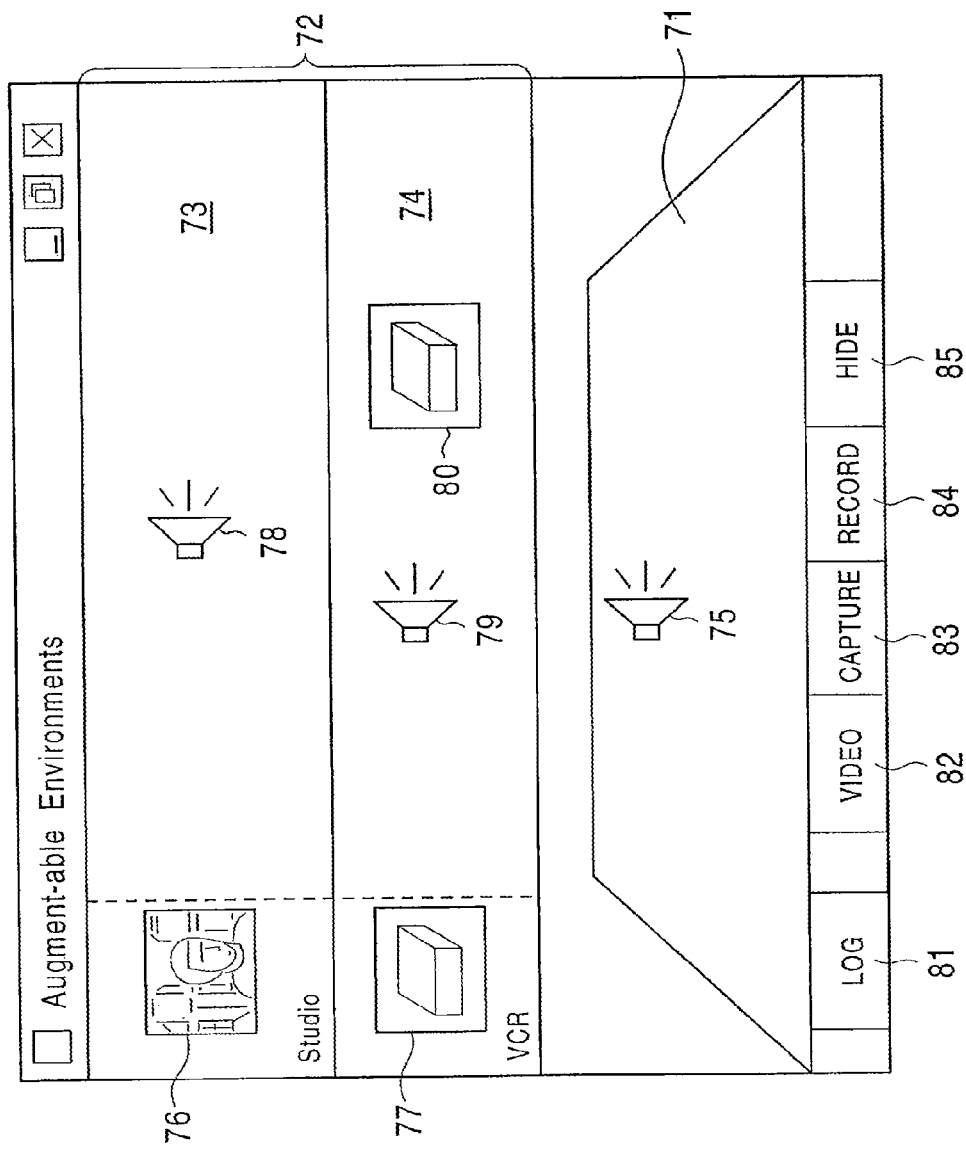
FIG. 6 is a representation showing one example of a screen image of an HUD.

As shown in FIG. 6, the display screen image on the HUD 27 is divided into a personal information tray 71 and a context-aware area 72. In the personal information tray 71, information carried with the user, such as a voice memo and an image snap shot, is indicated by a voice icon memo 75.

The context-aware area 72 corresponds to the situation of the real world, and the screen image in the area 72 varies each time the situation is changed with movement of the user. The context-aware area 72 is divided into a location field 73 corresponding to the position information at a room level, and an object field 74 corresponding to the recognized object. When the user is present in the editing studio and stands in front of a VCR, an icon 76 representing that the user is now present in the editing studio is indicated on the left side of the location field 73, and an icon 77 representing that the user is now standing in front of the VCR is indicated on the left side of the object field. In the location field 73, a voice memo that is information attached to the editing studio is represented as an icon 78. By clicking the icon 78 with the mouse 23, the user can listen the corresponding voice through the earphone 28. In the object field 74, information attached to the VCR is represented as a voice memo icon 79 and an image snap shot icon 80.

Figure 7A:
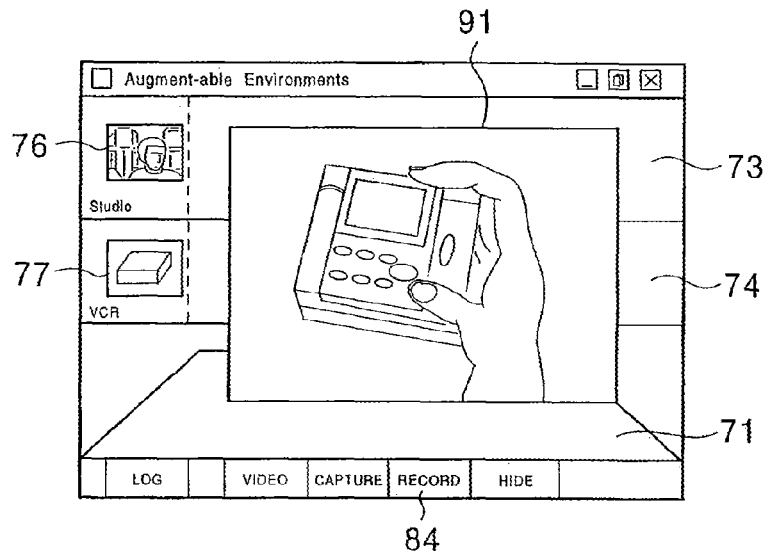
FIGS. 7A to 7C are representations for explaining the operation of moving an icon between a personal information tray and a context-aware area.

One example of screen images displayed when the user attaches information created in the personal information tray 71 to the context-aware area 72, will be described below with reference to FIGS. 7A to 7C.

Figure 7B:
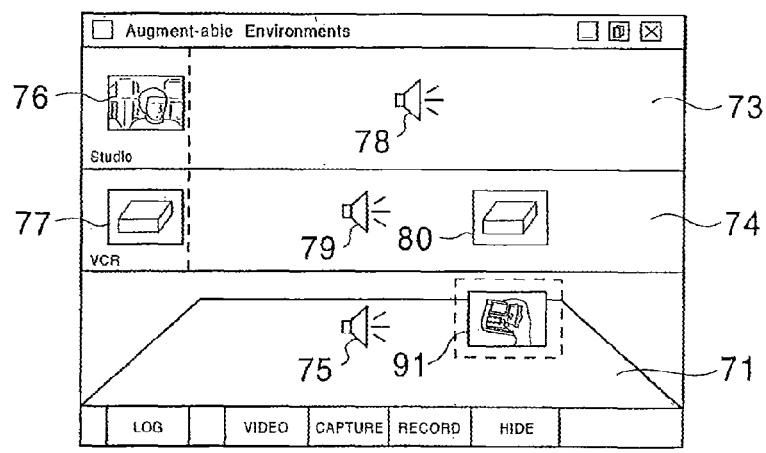
Figure 7C:
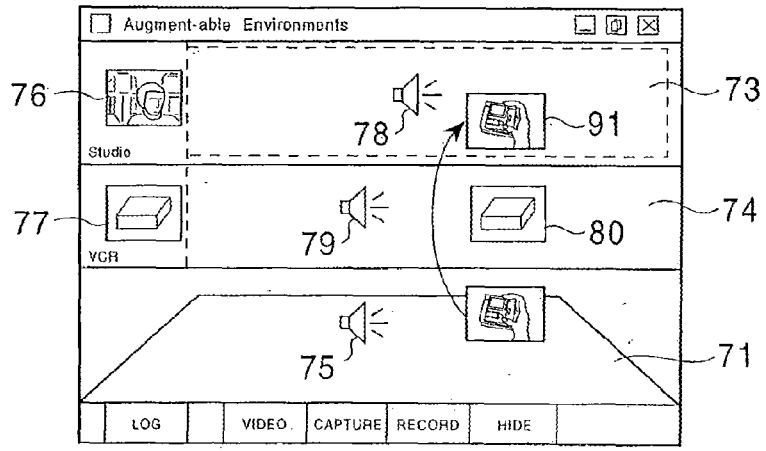

When the user clicks a RECORD button 84 with the mouse 23, a voice note icon 91 is produced (FIG. 7A) and is displayed in the personal information tray 71 (FIG. 7B). Then, when the user operates the mouse 23 to drag and drop the icon 91 in the location field 73 for the editing studio, the icon 91 is pasted to the room of the editing studio (FIG. 7C). The result of the above operation is transmitted to the server 12 via the wireless LAN 16. The server 12 registers the received data in the database 12a and provides the data to other users as required.

One example of a screen image in a time machine mode will be described below with reference to FIG. 8. If not specified otherwise, the following description is made in connection with the case that today is April 2 and the user goes back one day, i.e., to April 1 and returns to the front of the VCR in the meeting room.

An icon 101 representing that the user is in the meeting room on April 1 is indicated on the left side of the location field 73. By clicking a context switch button 107 on the left side of the icon 101, the user can go back to the rooms which the user has visited so far. By clicking a context switch button 108 on the left side of the icon 102, the user can go back to the objects (things) which have been recorded so far.

A time indicator 109 indicates the date and time of the situation displayed in each field. In this case, it is seen from the time indicator 109 that the meeting room at 12:15 one day before, i.e., on April 1, is displayed in the location field 73, and the VCR at 12:15 on April 1 is displayed in the object field 74. Further, it is seen from the time indicator in the personal information tray 71 that the current date and time is 12:15 on April 2. By clicking up and down buttons (U, D) in each field, the user can move to the situation in the future or past. For example, by pushing an up button U73 in the time indicator 109 displayed in the location field 73, the user can move to the meeting room on April 3 (tomorrow), for example, and attach information to that situation.

Icons 103 to 106 represent items of information which are attached to the respective fields.

The process of creating information to be attached to situations in the real world and registering the information in the database 12a, which is prepared on the network, in the Augment-able Reality system shown in FIG. 3 will be described below with reference to a flowchart of FIG. 9.

First, when the user having the wearable unit 11 put on himself or herself moves to a predetermined room (e.g., the editing studio), the IR sensor 22 receives the IR signal transmitted from the IR beacon 17 and supplies the received signal to the position information detecting unit 62 via the interface box 25 in step S1.

In step S2, the position information detecting unit 62 detects, based on the supplied signal, the position at a room level (e.g., the fact that the room is the editing studio), and supplies the detected position data to the control unit 65.

In step S3, the CCD video camera 21 takes in the visual ID (e.g., two-dimensional bar code) 52 pasted onto the object (e.g., VCR) 51, and supplies the inputted visual ID 52 to the image processing unit 61 via the PCMCIA interface 31.

In step S4, the image processing unit 61 identifies the object (e.g., VCR) 51 based on the supplied visual ID 52, and supplies the identified object data to the control unit 65.

In step S5, the user having the wearable unit 11 put on himself or herself inputs through the microphone 24 a voice (i.e., a voice memo) to be attached to the editing studio and the VCR, and the inputted voice data is supplied to the voice processing unit 63.

In step S6, the voice processing unit 63 executes a predetermined process on the supplied voice data and supplies the processed voice data to the control unit 65, followed by proceeding to step S7.

In step S7, the control unit 65 transmits the supplied position data, object data and voice data to the server 12 via the communication unit 32, followed by proceeding to step S8.

In step S8, the communication unit (not shown) of the server 12 receives the transmitted position data, object data and voice data via the wireless LAN 16.

In step S9, the server 12 registers the received voice data in the database 12a in correspondence to the position data and the object data, thereby completing the process.

The process of reading and displaying the information, which has been attached to situations in the real world, from the database 12a in the Augment-able Reality system shown in FIG. 3 will be described below with reference to a flowchart of FIG. 10.

First, when the user having the wearable unit 11 put on himself or herself moves to a predetermined room (e.g., the editing studio), the IR sensor 22 receives the IR signal transmitted from the IR beacon 17 and supplies the received signal to the position information detecting unit 62 via the interface box 25 in step S21.

In step S22, the position information detecting unit 62 detects, based on the supplied signal, the position at a room level (e.g., the fact that the room is the editing studio), and supplies the detected position data to the control unit 65.

In step S23, the CCD video camera 21 takes in the visual ID (e.g., two-dimensional bar code) 52 pasted onto the object (e.g., VCR) 51, and supplies the inputted visual ID 52 to the image processing unit 61 via the PCMCIA interface 31.

In step S24, the image processing unit 61 identifies the object (e.g., VCR) 51 based on the supplied visual ID 52, and supplies the identified object data to the control unit 65.

In step S25, the control unit 65 transmits the supplied position data and object data to the server 12 via the communication unit 32, followed by proceeding to step S26.

In step S26, the communication unit (not shown) of the server 12 receives the transmitted position data and object data via the wireless LAN 16.

In step S27, the server 12 reads, from the database 12a, the voice data corresponding to the received position data and object data, followed by proceeding to step S28.

In step S28, the server 12 transmits the read voice data to the sub-notebook PC 26 from the transmission unit, followed by proceeding to step S29.

In step S29, the transmission unit 32 of the sub-notebook PC 26 receives the transmitted voice data via the wireless LAN 16, and supplies the received voice data to the control unit 65, followed by proceeding to step S30.

In step S30, the control unit 65 produces an icon corresponding to the supplied voice data, and supplies the created icon to the combining unit 66.

In step S31, the combining unit 66 combines the created icon with the image data of the current sight supplied from the CCD video camera 21, and displays a combined image on the HUD 27, thereby completing the process.

Figure 11:
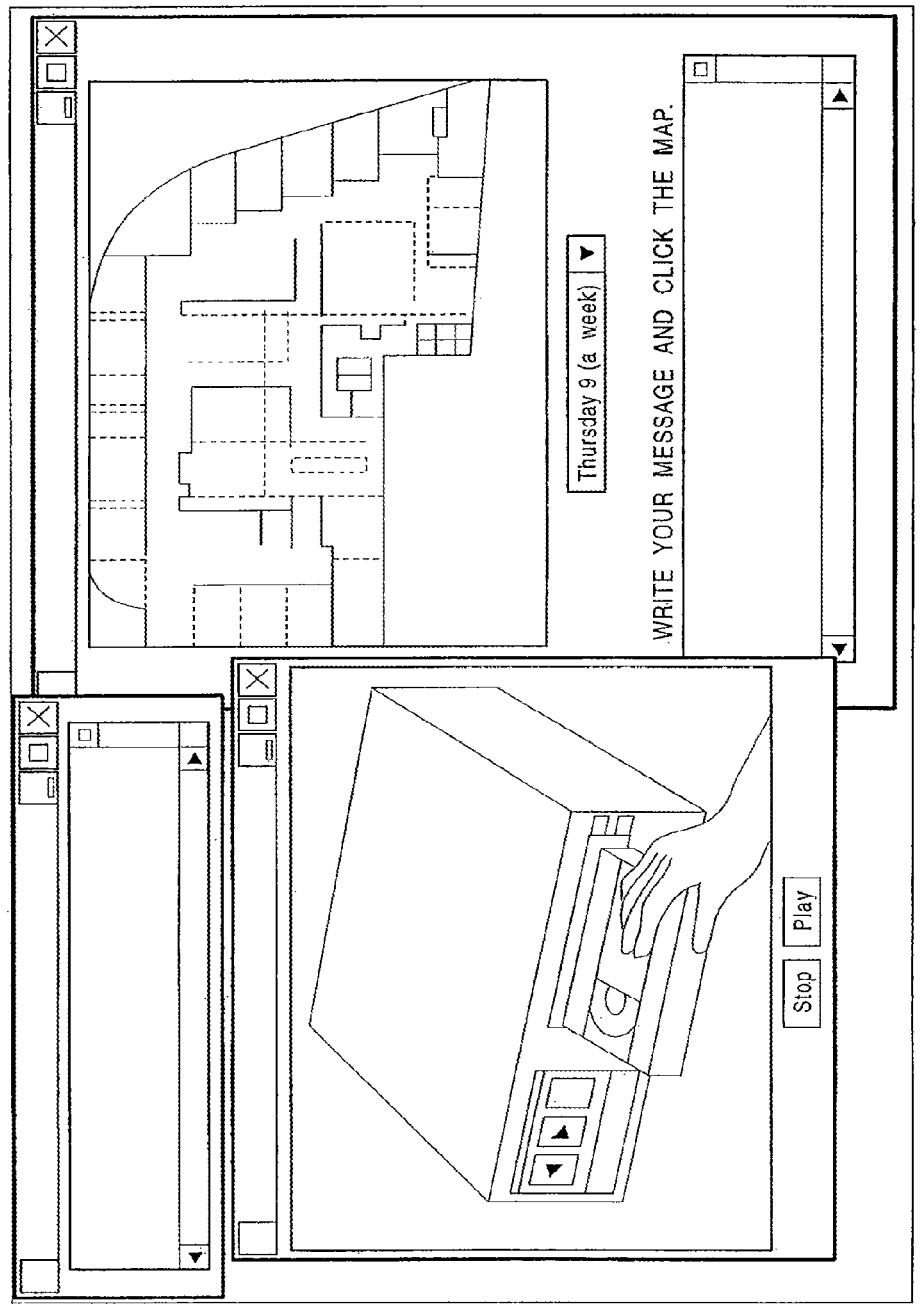
FIG. 11 is a representation showing one example of a screen image of Java applet in a computer (41) in FIG. 3.

The case of accessing the database 12a from normal computer environments will be described below. FIG. 11 shows one example of a screen image when information of the database 12a is acquired from a map on the WWW described by, e.g., the so-called Java applet. In the screen image of FIG. 11, the user can also attach information to situations (such as a position and an object) in the real world acquired via the WWW and displayed on the screen.

Further, the user can send an E-mail addressed to the situation of the real world by utilizing the computer 42. For example, when an E-mail is transmitted from the computer 42 to a "room 3" as shown in FIG. 12, the server 12 receives the E-main via the E-mail interface 14. Then, when another user having the wearable unit 11 put on himself or herself comes to the "room 3," the contents of a message (e.g., "Today's meeting is cancelled.") is displayed on the HUD 27 and informed to the other user.

While an IR beacon is employed to detect a position in the above first embodiment, detection of the position can also be made by utilizing the GPS (Global Positioning System) or PHS (Personal Handyphone System).

Additionally, a providing medium for providing a computer program for executing the above processes in the first embodiment to users includes not only an information recording medium such as a magnetic disk or CD-ROM, but also a transmission medium in the form of a network employing the Internet or digital satellites.

It is to be noted that the term "system" used in the first embodiment implies an overall facility made up of a number of devices, units and the like.

Next, a second embodiment of the present invention will be described with reference to FIGS. 13 to 20.

The second embodiment of the present invention relates to an information processing system in which an ID already attached to an object in the real world is read by an ID reader so that, based on the read ID, the user can register and retrieve a bulletin board in the BBS, for example, on the Internet or PC communication services, can browse information of the object corresponding to the ID on the retrieved bulletin board, and can write and exchange information of the object to which the ID is attached.

Figure 13:
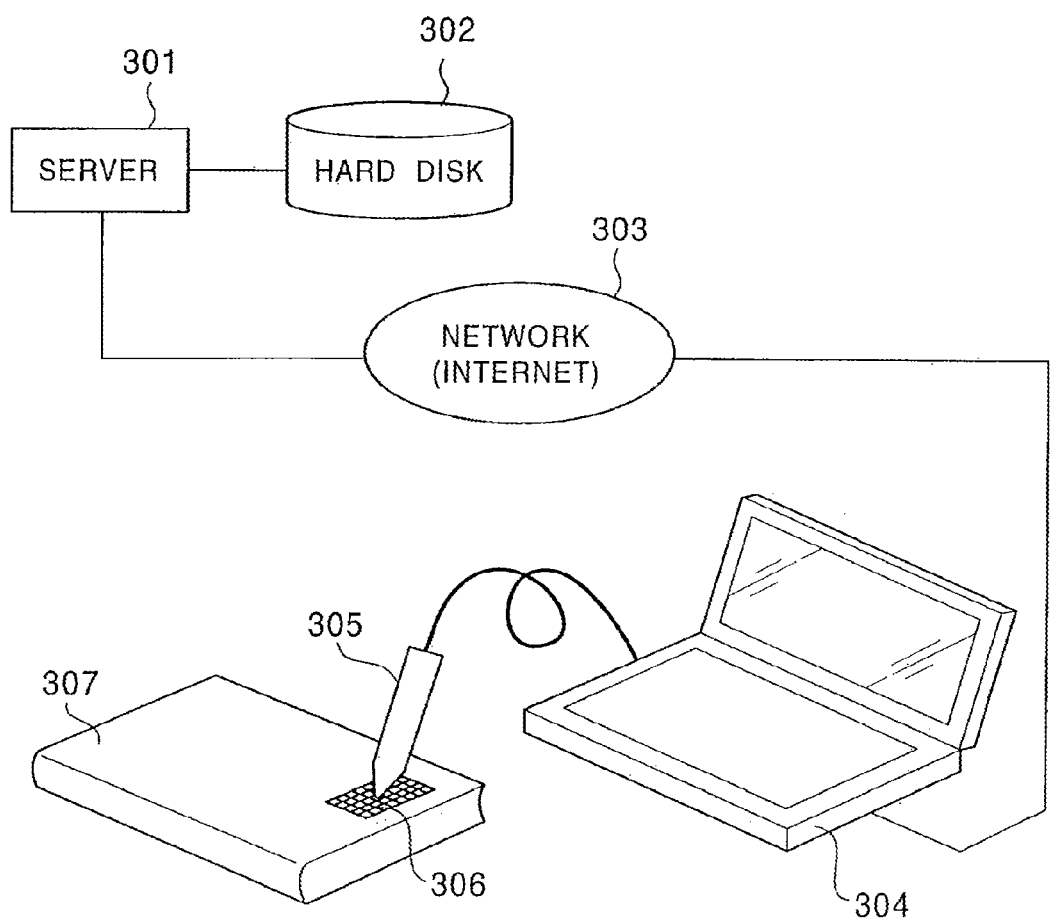
FIG. 13 is a schematic view showing one example of conceptual configuration of a system according to a second embodiment of the present invention.

FIG. 13 shows one concrete system according to the second embodiment of the present invention. In this embodiment, a wearable sub-notebook PC is used as one example of a personal computer. The system shown in FIG. 13 represents the case of employing a client PC 304 as one example of an information processing apparatus (i.e., a user terminal), a book 307 as one example of an object in the real world, a bar code 306 as one example of an ID attached to the book 307, a bar code reader 305 for reading the bar code 306 as one example of an ID reader for reading the ID, the Internet as one example of a network 303, and a server 301 including a hard disk 302 as one example of another information processing apparatus, respectively. The configuration of FIG. 13 is shown by way of example and the present invention is not limited to the illustrated one.

In FIG. 13, the server 301 is similar to an ordinary WWW (World Wide Web) server, and comprises a main unit computer (server 301), the hard disk 302 for storing information of bulletin boards associated with objects corresponding to IDs, a network connecting device (not shown) for connecting the server 301 to the network 303, etc.

Further, the client PC 304 comprises a sub-notebook PC including a modem, a PCMCIA interface, etc., and is connectable to the Internet or the like via the modem. The client PC 304 is also connectable to the bar code reader 305 (possibly a CCD camera instead), which serves as the ID reader, via the PCMCIA interface. The device for reading the ID is not limited to an independent standalone device such as the ID reader in FIG. 13 (e.g., the bar code reader), but may be such a device as assembled in the client PC 304. For example, in the case that a CCD camera is assembled in the client PC 304, the CCD camera can be used as the ID reader. As another example, when numerals or the like that are visually readable by the user are employed as an ID attached to an object in the real world, a keyboard (e.g., a keyboard of the client PC 304) for entering the ID is also included in the category of the ID reader.

Figure 14:
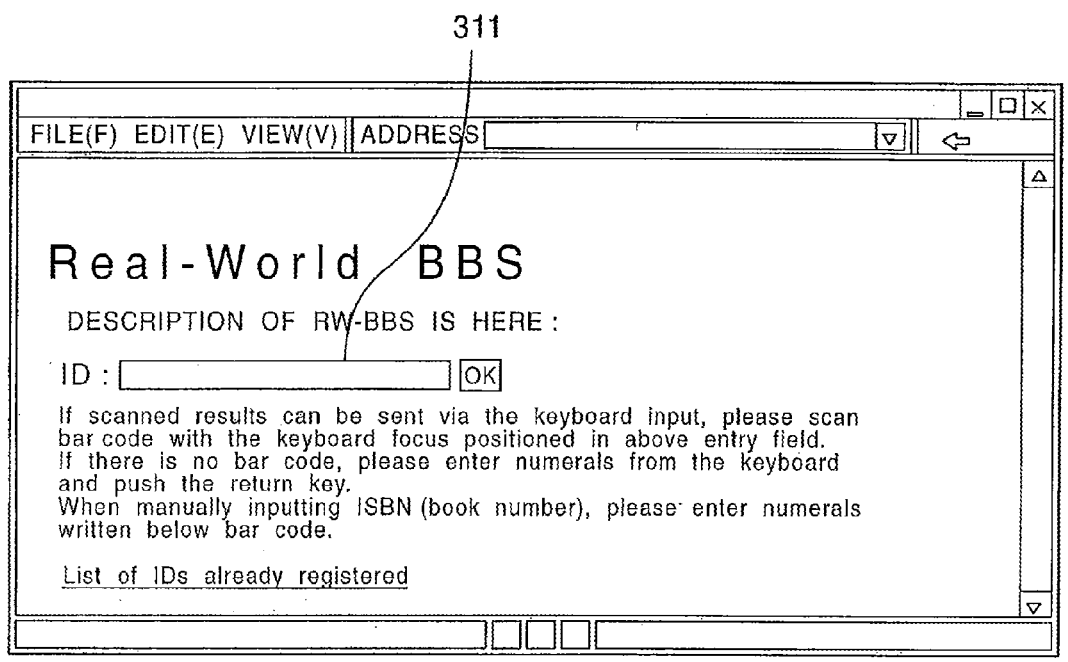
FIG. 14 is a representation showing one example of an initial screen image on a client PC in a BBS search using an ID.

FIG. 14 shows one example of an initial screen image displayed on a display unit (e.g., a liquid crystal display) of the client PC 304 when an ID (e.g., the bar code 306) already attached to an article (e.g., the book 307) in the real world is taken in by an ID reader (e.g., the bar code reader 305) and bulletin boards present in the Internet server 301, for example, are searched based on the inputted ID. Note that FIG. 14 shows one example of the initial screen image and the present invention is not limited to the illustrated one.

Referring to FIG. 14, an ID entry field 311 is indicated in the initial screen image. When the user wants to browse the bulletin board which carries information regarding the book 307 in the real world, such as critics and details, the user operates the bar code reader 305 to read the bar code 306 attached to the book 307 (or the user enters numerals of the bar code from the keyboard), whereupon the numerals corresponding to the bar code 306 are inputted in the ID entry field 311 of the initial screen image.

When the ID (numerals) is inputted in the ID entry field 311, the client PC 304 accesses the server 301 in such a manner as to encode the ID into a URL (Uniform Resource Locator) of the WWW. If the ID is recognized as, e.g., "9780123456789," a URL is given below, for example:

http://www.aaa.com/cgi-bin/bbs.cgi?id=9780123456789

Figure 15:
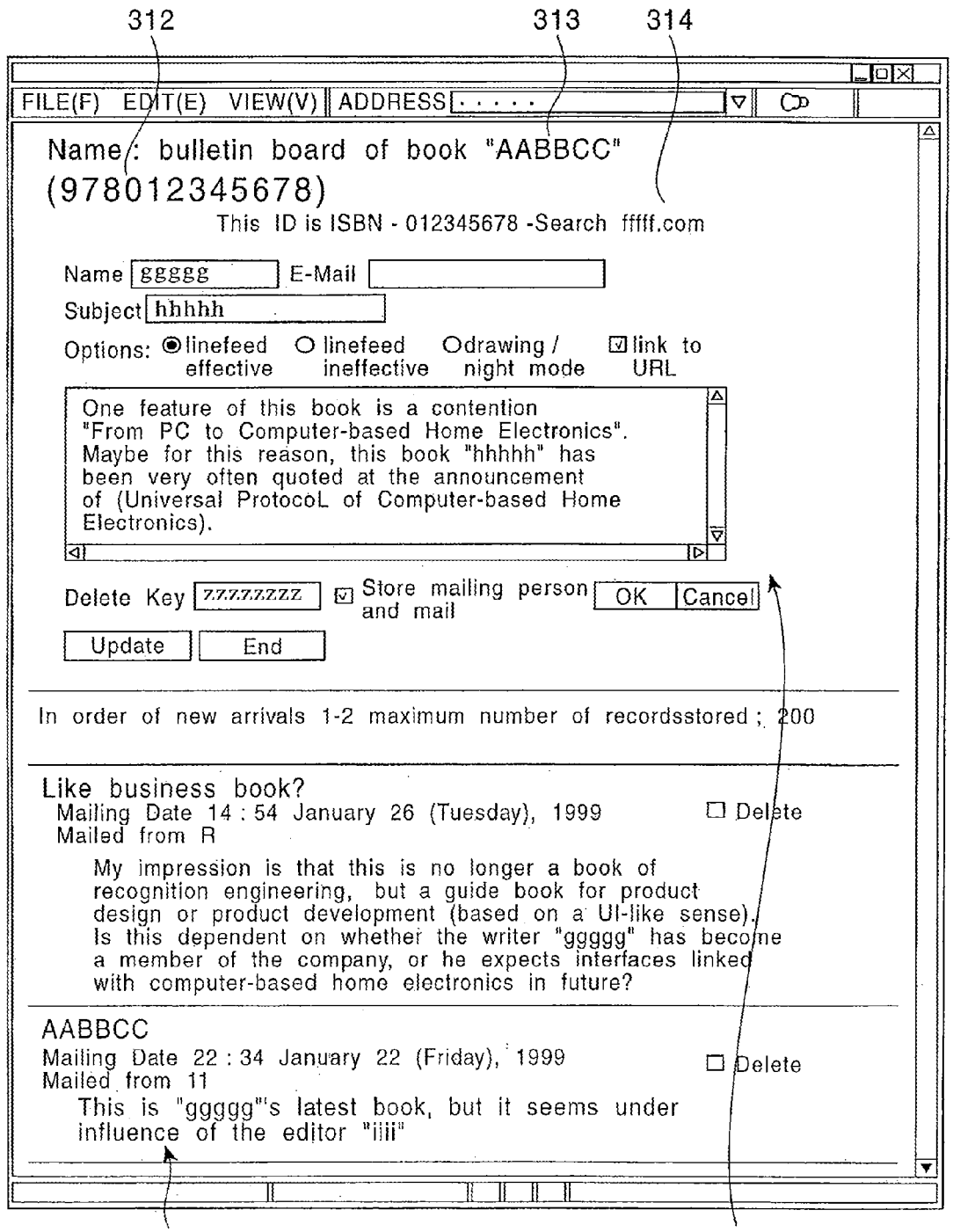
FIG. 15 is a representation showing one example of a screen image of a bulletin board retrieved in accordance with the ID.

If the bulletin board corresponding to the ID is already registered in the server 301 upon such an access to the server 301, the server 301 displays an image of the bulletin board corresponding to the ID as shown in FIG. 15, by way of example, on the display screen of the client PC 304. Note that FIG. 15 shows one example of the display screen image and the present invention is not limited to the illustrated one.

More specifically, the screen image of the bulletin board shown in FIG. 15 includes, e.g., an ID number field 312 for indicating the ID number ("9780123456789"); a bulletin board name field 313 for indicating the name of the bulletin board ("Bulletin board of book 'AABBCC'" in this example); a link address field 314 for link to another search service (e.g., a link for on-line shopping); a mailing field 315 in which a field, buttons, etc. for new mailing to the bulletin board are indicated; and a registered information field 316 for indicating information already registered on the bulletin board. Since the bulletin board in the format shown in FIG. 15 enables users to browse and exchange information of the object (book) corresponding to the ID, each user can refer to opinions of others, retrieve a desired bulletin board, or write new information on the bulletin board as with the ordinary BBS, for example.

On the other hand, in some cases, when the server 301 is accessed with a URL corresponding to the ID, the ID is not yet registered in the server 301 (the bulletin board corresponding to the ID is not present).

Figure 16:
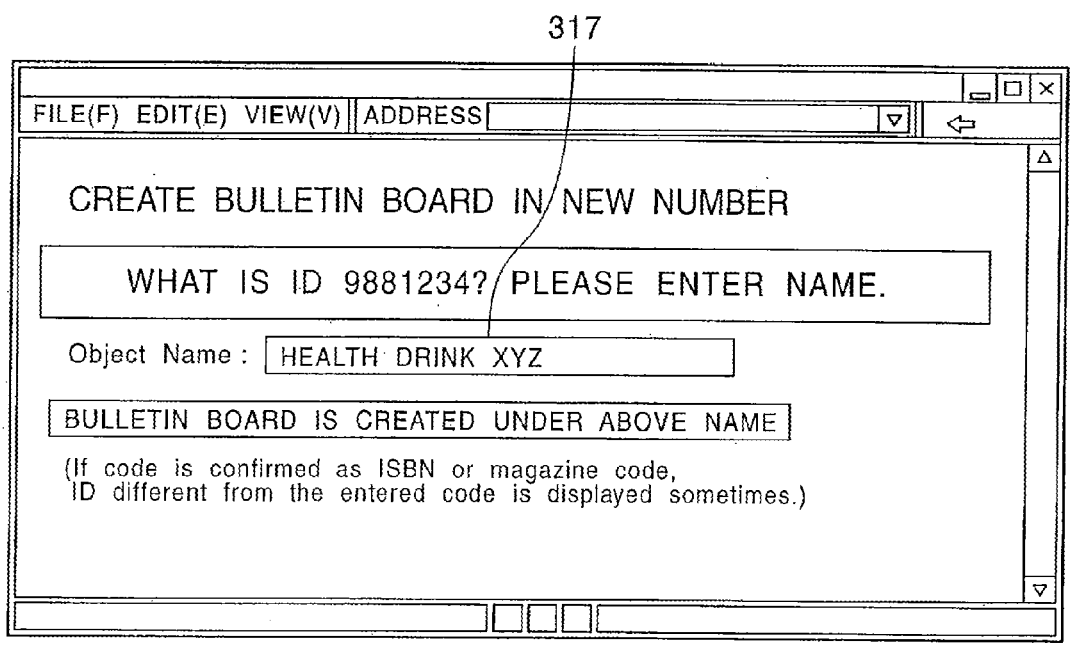
FIG. 16 is a representation showing one example of a screen image when an ID is newly registered.

In such a case, the server 301 displays, on the display screen of the client PC 304, a new registration screen image for prompting the user to make new registration of a bulletin board corresponding to the ID as shown in FIG. 16, by way of example. Note that FIG. 16 shows one example of the display screen image and the present invention is not limited to the illustrated one.

More specifically, the screen image for new registration shown in FIG. 16 includes a name entry field 317 for prompting the user to enter basic information, e.g., the name of the article, corresponding to the ID ("9881234" in the example of FIG. 16). When the user inputs, in the name entry field 317, the name of the article ("Health Drink XYZ" in the example of FIG. 16) corresponding to the ID, a new bulletin board designated by the ID ("9881234") and "Health Drink XYZ," i.e., the name of the article corresponding to the ID, is registered in the server 301.

With the second embodiment of the present invention, as described above, based on the ID already attached to an article (object) in the real world, the user can register and retrieve, e.g., a bulletin board in the Internet BBS, can browse information of the article corresponding to the ID on the retrieved bulletin board, and can write and exchange information of the article corresponding to the ID.

Of course, the second embodiment is not limited to the book or health drink described above, but is also applicable to other suitable products. By scanning a bar code attached to a music CD, for example, it is possible to access or jump to a bulletin board for the CD, and hence to easily acquire information regarding the music of the CD. Since the bulletin board for the CD can be accessed by other users who are interested in the same CD, circulation of information and formation of user communities is promoted. Likewise, by scanning a bar code attached to an electric product, for example, it is possible to obtain the latest information relating to the electric product from the user community.

In the system of the second embodiment, the information written on the bulletin board is not limited to information provided from the client PC side as described above, but may be, e.g., information of various products marketed from the product selling side. When the product selling side offers the product information via the BBS, a place for exchanging information can be provided through a universal interface for, e.g., all types of products marketed from the product selling side.

In the second embodiment, the ID is assumed to be a typical bar code as described above. This is because model numbers are printed or attached in the form of bar codes onto most of products and they can be used as IDs as they are. There are other available ID systems including, e.g., the JAN code (the EAN code in Europe), the ISBN code, and the CDDB ID. The JAN code is one type of bar code systems, and is printed in the form of a bar code on a product package for uniquely identifying a packaged product. The ISBN code is a code system for uniquely identifying a book, and the code number is printed on, e.g., a back cover of each book. In many cases, a bar code corresponding to the ISBN code is also printed along with the ISBN code. The CDDB ID is an ID system used on the Internet for identifying CDs, and is already available at the URL /http:/www.cddb.com. More specifically, the CDDB ID is created by processing information of a music CD, such as the number of tracks and the playing time, for conversion into numerals of 32 bits. The CDDB ID number can be used as an ID of each CD. Further, the name capable of uniquely identifying an object can also be used as an ID in addition to a bar code. For example, the address of E-mail for identifying persons, the URL of a home page on the WWW, the phone number, the address, and other proper names such as the company name, the trade name, the name of a store and the brand name, can be used as an ID.

Additionally, it is conceivable that a two-dimensional ID such as the so-called cybercode and a non-contact ID such as a wireless tag are used as IDs. Depending upon the type of ID, the screen image can be linked with another information service, e.g., on-line shopping. The example shown in FIG. 15 represents a BBS screen image provided when scanning the universal number (e.g., the ISBN code) of a book with a bar code reader, and includes not only information of the bulletin board regarding the book, but also the link address, indicated in the link address field 314, to an on-line book selling page.

Figure 17:
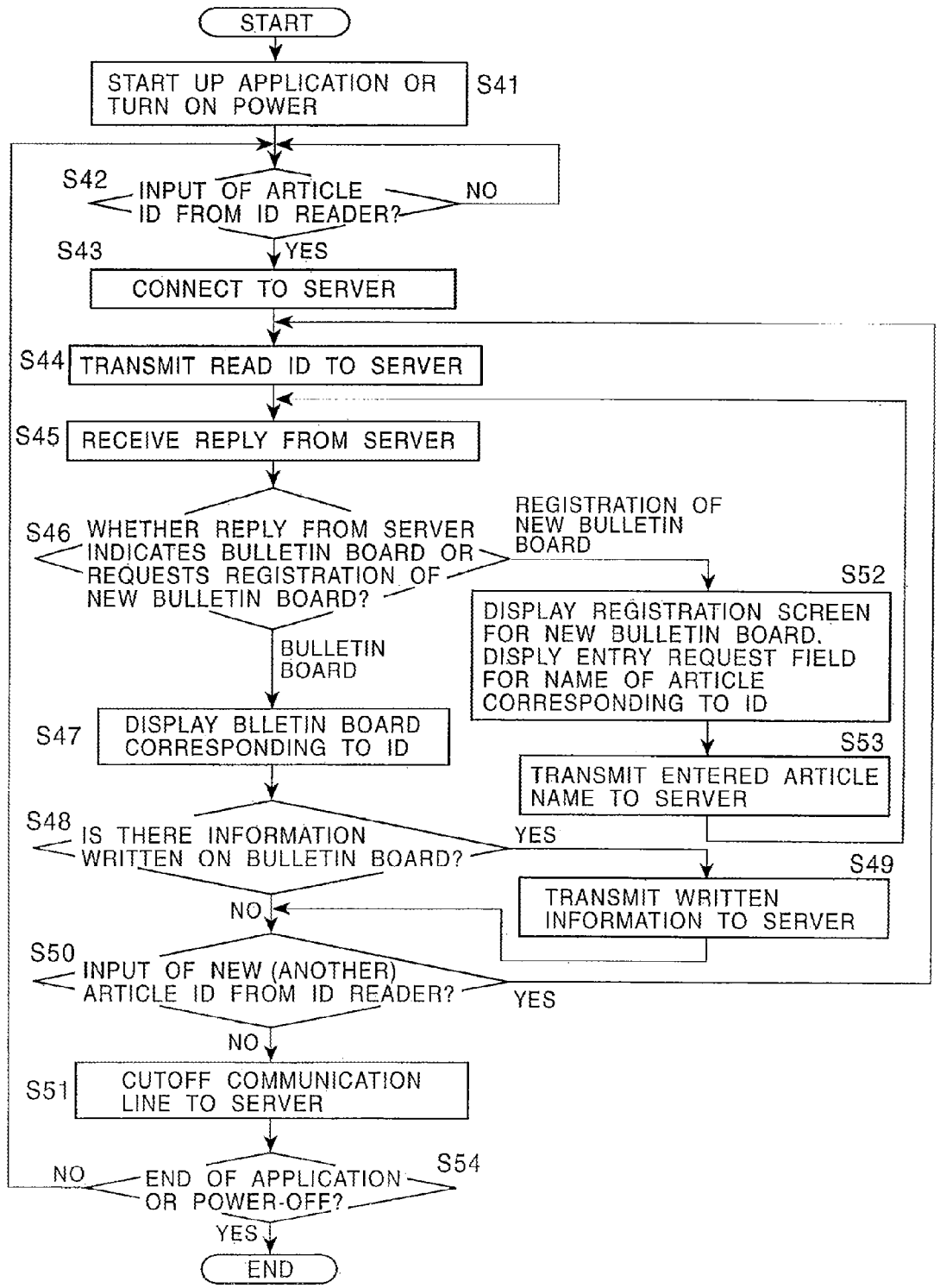
FIG. 17 is a flowchart showing a process flow when retrieval and browsing of and writing on a bulletin board corresponding to an article ID are performed, or a bulletin board is newly registered on the client PC side in the system according to the second embodiment.

FIG. 17 shows a process flow when on the client PC side in the system according to the second embodiment, an ID attached to an article in the real world is read by an ID reader, and retrieval and browsing of and writing on a bulletin board corresponding to the ID are performed, or a bulletin board is newly registered. Note that FIG. 17 shows one example of the process flow and the present invention is not limited to the illustrated one.

Referring to FIG. 17, in step S41, the client PC 304 first starts application software for running a BBS search with an ID according to the second embodiment. In the second embodiment, since the client PC 304 including a personal computer is employed as one example of the user terminal, the application software is started to run a BBS search in step S41. However, if the user terminal is a dedicated device for exclusively executing a BBS search and display with an ID, the dedicated device is powered on in step S41.

When the application software is started in step S41, the client PC 304 waits in step S42 for an input of an article ID from the ID reader 305. If the article ID 306 is inputted from the ID reader 305, the client PC 304 establishes connection to the server 301 in step S43, and transmits the inputted ID 306 to the server 301 in step S44 after encoding the ID into a corresponding URL.

Then, in step S45, the client PC 304 receives a reply from the server 301. The reply from the server 301 is provided as either information of a bulletin board corresponding to the ID as shown in FIG. 15, or a request for registration of a new bulletin board (registration of a new ID) as shown in FIG. 16. Accordingly, the processing in the client PC 304 advances to steps subsequent to S47 if the reply from the server 301 is information of a bulletin board, and to steps subsequent to S52 if the reply from the server 301 is a request for registration of a new bulletin board.

If it is determined in step S46 that the reply from the server 301 is information of a bulletin board, the client PC 304 displays an image screen of the bulletin board corresponding to the ID as shown in FIG. 15, by way of example, on the display screen in step S47.

On the other hand, if it is determined in step S46 that the reply from the server 301 is a request for registration of a new bulletin board, the client PC 304 goes to step S52 in which it displays, on the display screen, a new registration screen image for prompting the user to make new registration of a bulletin board corresponding to the ID as shown in FIG. 16, and also indicates, in the screen image for new registration, the name entry field 317 for prompting the user to enter the name of an article corresponding to the ID.

Thereafter, in step S53, the client PC 304 transmits the name of the article entered in the name entry field 317 to the server 301. After the completion of step S53, the process flow returns to step S45. As a result, the newly registered bulletin board is transmitted to the client PC 304 from the server 301.

Then, the client PC 304 determines in step S48 whether there is any information to be written on the bulletin board. If there is any information to be written on the bulletin board, the client PC 304 transmits the written information to the server 301 in step S49. After the completion of step S49, the process flow goes to step S50.

If it is determined in step S48 that there is no information to be written on the bulletin board, the processing in the client PC 304 advances to step S50.

In step S50, the client PC 304 determines whether there is an input of a new ID from the ID reader. If it is determined in step S50 that a new ID is inputted from another article, for example, the processing of the client PC 304 returns to step S44, following which the new ID is transmitted to the server 301. On the other hand, if it is determined in step S50 that a new ID is not inputted, the process flow goes to step S51.

If an input of a new ID is not determined in step S50 and cutoff of the communication line is instructed from the user, the client PC 304 cuts off the communication line between itself and the server 301 in step S51. After cutoff of the communication line in step S51, if it is determined in step S54 that the application has been brought into end or the power has been turned off, the processing shown in the flowchart of FIG. 17 is ended. If it is determined in step S54 that neither the application has been brought into end nor the power has been turned off, the process flow returns to step S42 in which the client PC 304 waits for an ID input. In the flowchart of FIG. 17, the communication line between the server 301 and the client PC 304 is connected at the time of starting transmission of the ID to the server 301, and the communication line is cut off upon an instruction from the user to cut off it. However, the client PC 304 may be kept always connected to the server 301.

Figure 18:
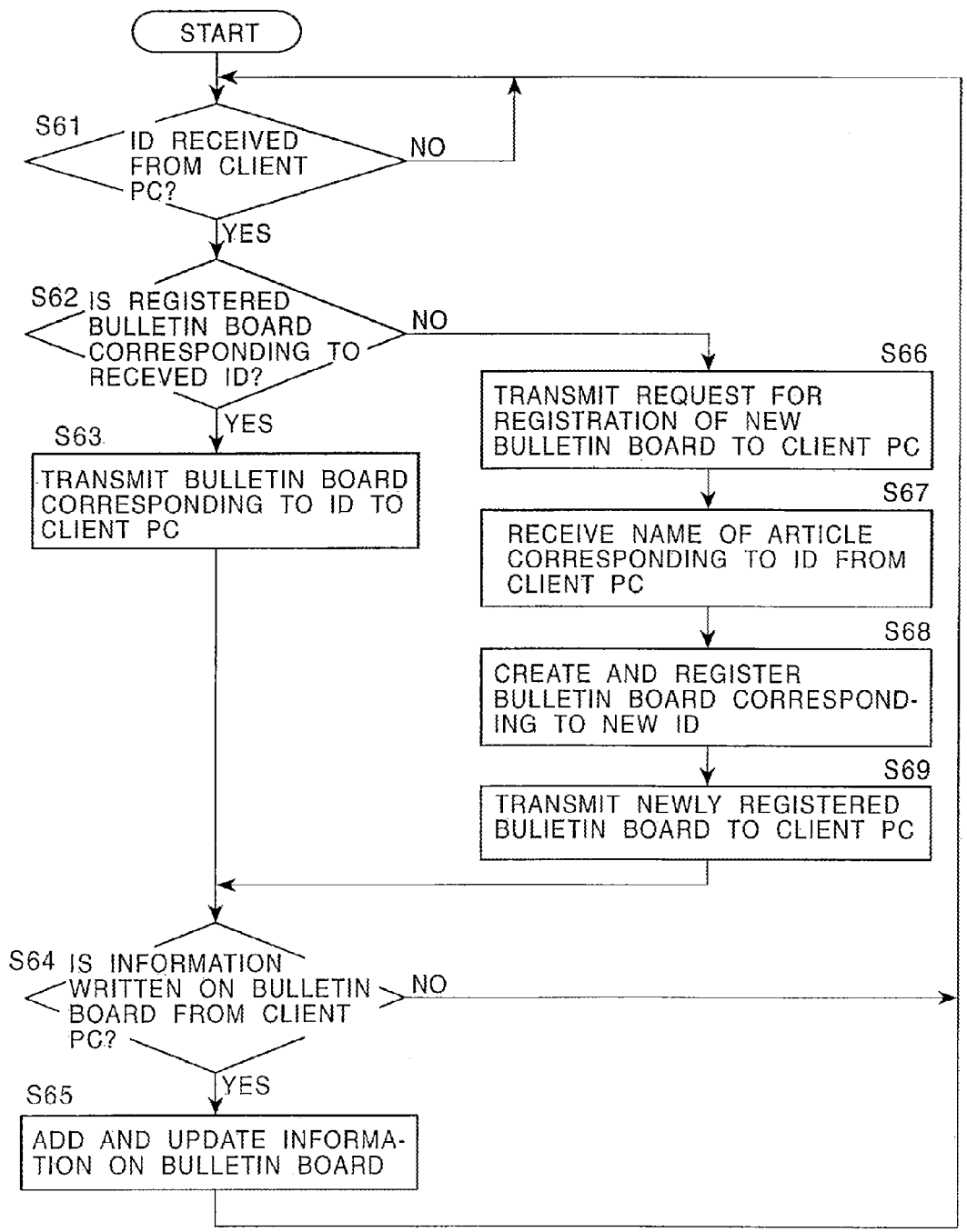
FIG. 18 is a flowchart showing a process flow when the bulletin board corresponding to the article ID or a request for new registration of a bulletin board is transmitted to the client PC from the server side in the system according to the second embodiment.

FIG. 18 shows a process flow when, in response to an ID transmitted from the client PC 304, the bulletin board corresponding to the ID or a request for new registration of a bulletin board is transmitted to the client PC 304 from the side of the server 301 in the second embodiment. Note that FIG. 18 shows one example of the process flow and the present invention is not limited to the illustrated one.

Referring to FIG. 18, as shown in step S61, the server 301 is always held in a state waiting for reception of an ID from the client PC 304. If the server 301 receives an ID from the client PC 304 in step S61, the process flow goes to step S62.

After receiving an ID from the client PC 304 in step S61, the server 301 determines in step S62 whether the received ID is registered, i.e., whether the bulletin board corresponding to the received ID is registered. If it is determined in step S62 that the bulletin board corresponding to the received ID is not registered, the processing in the server 301 advances to steps subsequent to S66, whereas if it is determined in step S62 that the bulletin board corresponding to the received ID is registered, the processing in the server 301 advances to steps subsequent to S63.

If it is determined in step S62 that the bulletin board corresponding to the received ID is registered, the server 301 transmits information of the bulletin board corresponding to the ID to the client PC 304 in step S63. After the completion of step S63, the process flow goes to step S64.

On the other hand, it is determined in step S62 that the bulletin board corresponding to the received ID is not yet registered, the server 301 transmits, to the client PC 304, information of the new registration screen image for prompting the user to make new registration of the bulletin board corresponding to the ID as shown in FIG. 16.

After receiving the name of an article corresponding to the ID from the client PC 304 in step S67, the server 301 creates and registers, as the bulletin board corresponding to the received ID, a bulletin board for the name of the article in step S68, and then transmits information of the newly registered bulletin board to the client PC 304 in step S69. After the completion of step S69, the process flow goes to step S64.

Then, the server 301 determines in step S64 whether new information is written on the bulletin board from the client PC 304, i.e., whether new written information is transmitted from the client PC 304. If it is determined in step S64 that no information is written on the bulletin board, the processing in the server 301 returns to step S61 in which the server 301 is held in the state waiting for reception of an ID from the client PC 304.

On the other hand, if it is determined in step S64 that information is written on the bulletin board, the server 301 adds the written information to the bulletin board or updates the information on the bulletin board depending upon the written information in step S65. After the completion of step S64, the processing in the server 301 returns to step S61 in which the server 301 is held in the state waiting for reception of an ID from the client PC 304.

The above second embodiment has been described in connection with an example in which one bulletin board corresponds to one ID. However, when a number of ID systems including, e.g., the JAN code (the EAN code in Europe), the ISBN code, the CDDB ID, and wireless tags, as described above, are usable together in the information processing system, it may happen that the same ID is used among a number of different ID systems. In such a case, one ID is used double or more and represents a number of different articles. If a number of different articles have the same ID, this results in that when a bulletin board corresponds to that ID is retrieved, a number of bulletin boards for the number of different articles are found out by a search.

In view of the above, the system of this embodiment is designed such that when a number of bulletin boards are found corresponding to the same ID in the server 301, the names, abstracts, etc. of the number of bulletin boards are provided to the client PC 304 so that the user may select desired one from among the number of bulletin boards.

Figure 19:
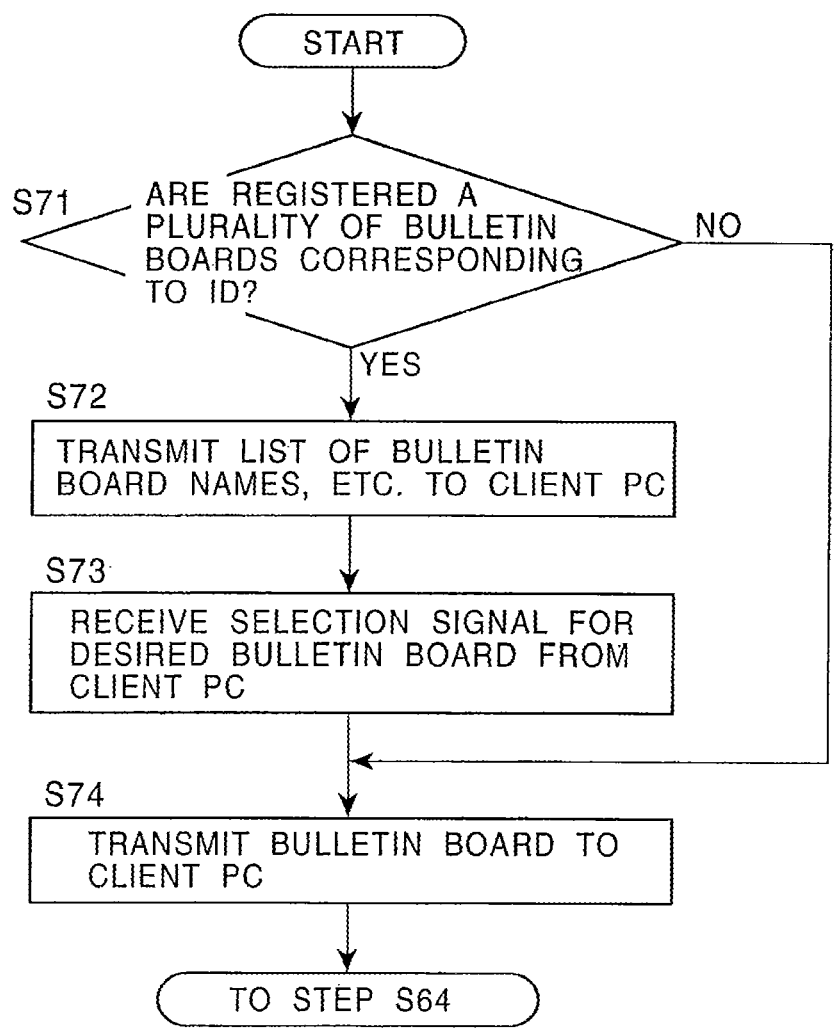
FIG. 19 is a flowchart showing a process flow on the server side when a number of bulletin boards corresponding to the same ID are found by a search.

FIG. 19 shows a process flow on the side of the server when a number of bulletin boards corresponding to the same ID are found out by a search as described above. Concretely, the process flow of FIG. 19 can be effected in, e.g., step S63 in the flowchart of FIG. 18. Note that FIG. 19 shows one example of the process flow and the present invention is not limited to the illustrated one.

Referring to FIG. 19, in step S71, the server 301 first determines whether when an ID is transmitted from the client PC 304, a number of bulletin boards are registered corresponding to the ID.

If it is determined in step S71 that a number of bulletin boards are not registered corresponding to the ID, information of the bulletin board corresponding to the ID is transmitted to the client PC 304 in step S74.

On the other hand, if it is determined in step S71 that a number of bulletin boards are registered corresponding to the ID, the server 301 transmits, e.g., a list of the names, abstracts, etc. of the number of bulletin boards to the client PC 304 in step S72.

After transmitting the list of the names, abstracts, etc. of the number of bulletin boards to the client PC 304, upon receiving a selection signal for the name, etc. (i.e., a selection signal for the bulletin board) which has been selected by the client PC 304 from among the list of the names, abstracts, etc. of the number of bulletin boards in step S73, the server 301 transmits information of the bulletin board corresponding to the selection signal to the client PC 304 in step S74.

Figure 20:
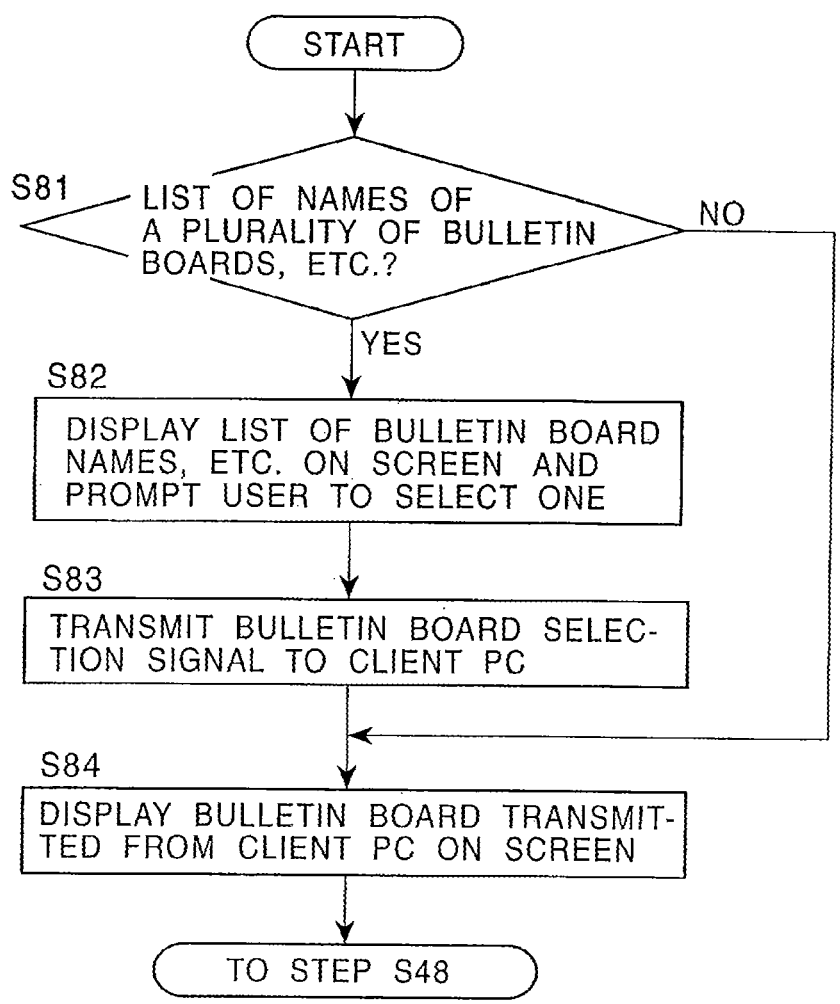
FIG. 20 is a flowchart showing a process flow on the client PC side when a list of the names, abstracts, etc. of the number of bulletin boards are transmitted from the server side.

FIG. 20 shows a process flow on the side of the client PC 304 when the list of the names, abstracts, etc. of the number of bulletin boards are transmitted from the side of the server 301. Concretely, the process flow of FIG. 20 can be effected in, e.g., step S47 in the flowchart of FIG. 17. Note that FIG. 20 shows one example of the process flow and the present invention is not limited to the illustrated one.

Referring to FIG. 20, in step S81, the client PC 304 first determines whether the signal transmitted from the server 301 provides the list of the names, etc. of the number of bulletin boards.

If it is determined in step S81 that the signal transmitted from the server 301 does not provide the list of the names, etc. of the number of bulletin boards, i.e., that information of one bulletin board corresponding to the ID is transmitted from the server 301, the client PC 304 displays the only one bulletin board transmitted from the server 301 on the display screen in step S84.

On the other hand, if it is determined in step S81 that the signal transmitted from the server 301 provides the list of the names, etc. of the number of bulletin boards, the client PC 304 displays the list of the names, etc. of the number of bulletin boards on the display screen in step S82, thereby prompting the user to select the desired name (i.e., the desired bulletin board) from among the list of the names, etc.

Then, in step S83, the client PC 304 transmits to the server 301 the name of the bulletin board that has been selected by the user from among the list of the names, etc. Thereafter, when information of the bulletin board corresponding to the selected name, etc. is transmitted from the server 301, the client PC 304 displays the bulletin board transmitted from the server 301 on the display screen in step S84.

In the case of employing a number of different ID systems together, the double or more use of the same ID can be avoided by managing the BBS in such a manner, for example, that the name (e.g., ISBN) of the ID system is added to each ID. More specifically, when the client PC 304 takes in an ID, it transmits the ID to the server 301 along with information indicating to which system the ID belongs (i.e., the name of the ID system). The server 301 searches bulletin boards based on both the ID and the information (the name of the ID system) added to the ID. With such a management, even if the same ID is employed in different ID systems, one bulletin board can be retrieved corresponding to one ID.

Additionally, a providing medium for providing a computer program for executing the above processes in the second embodiment to users includes not only an information recording medium such as a magnetic disk or CD-ROM, but also a transmission medium in the form of a network employing the Internet or digital satellites.

It is to be noted that the term "system" used in the second embodiment implies an overall facility made up of a number of devices, units and the like.

Next, a third embodiment of the present invention will be described with reference to FIGS. 21 to 28.

While an article in the real world (in practice, an ID attached to the article) is handled in correspondence to a bulletin board in the second embodiment, a position in the real world is handled in correspondence to a bulletin board in the third embodiment.

Specifically, the third embodiment relates to an information processing system in which a current position in the real world is taken in by a position recognizing device, and a bulletin board in the BBS on the Internet or PC communication services, for example, can be registered based on the inputted current position, which enables the user to retrieve and browse bulletin boards corresponding to the inputted current position and nearby positions, and which enables the user to write new information or to exchange information on and via the bulletin boards corresponding to the inputted current position and nearby positions.

Figure 21:
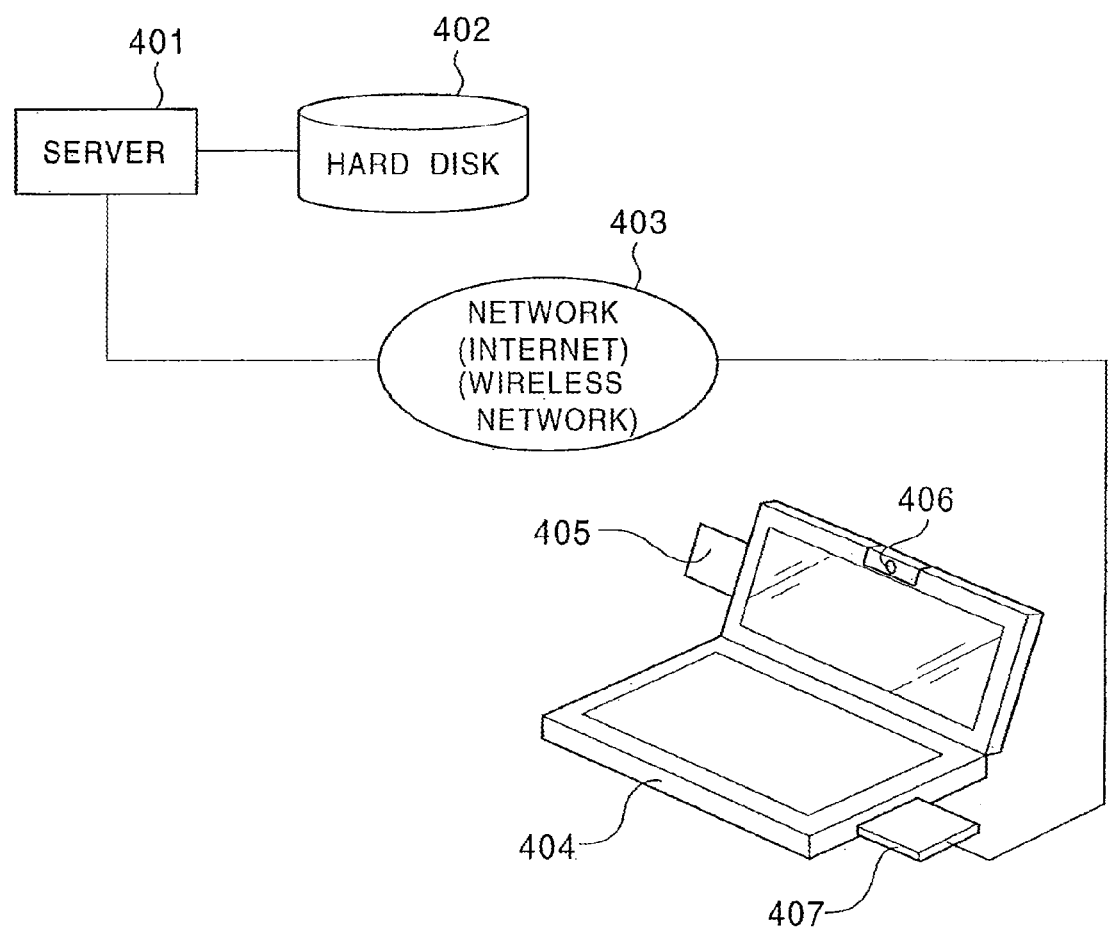
FIG. 21 is a schematic view showing one example of conceptual configuration of a system according to a third embodiment of the present invention.

FIG. 21 shows one concrete system according to the third embodiment of the present invention. In this embodiment, a sub-notebook PC is used as one example of a user terminal and is referred to as a client PC 404 hereinafter. The system shown in FIG. 21 represents the case of employing a portable client PC 404 as one example of an information processing apparatus (i.e., a user terminal), a position recognizing device 405 such as utilizing the GPS or PHS as one example of a device for detecting current position information in the real world, a wireless network and the Internet as one example of a network 403, and a server 401 including a hard disk 402 as one example of another information processing apparatus, respectively. Also, the client PC 404 includes an information input device 406 for inputting information (e.g., a text, a photograph and/or a voice memo) related to the current position. The user terminal may include the wearable computer 8 as with the first embodiment. The configuration of FIG. 21 is shown by way of example and the present invention is not limited to the illustrated one.

In FIG. 21, the server 401 is similar to the WWW server in FIG. 13, and includes a main unit computer (server 401), the hard disk 402 for storing information of, e.g., bulletin boards corresponding to respective positions in the real world, a network connecting device (not shown) for connecting the server 401 to the network 403, etc.

The user terminal (the client PC 404) includes a sub-notebook PC including a modem, a PCMCIA interface, etc., and is connected via the PCMCIA interface to a wireless network device 407 (including a cellular phone and PHS) and the position recognizing device 405 (such as utilizing the GPS or PHS). Further, the client PC 404 includes a CCD camera and a microphone as one example of the information input device 406 for inputting information related to the current position, and an internal clock for recognizing the current time. The CCD camera and the microphone serving as the information input device 406 may be integral with the client PC 404 or separate from the same. The client PC 404 can transmit current position information detected by the position recognizing device 405, current time information from the internal clock, and information related to the current position, such as a photograph and a voice memo inputted from the information input device 406 or text data inputted from a keyboard or the like, to the server 401 via the wireless network device 407 and the network 403.

In the system of the third embodiment, for example, when the bulletin board corresponding to the current position is not registered in the server 401 and is newly registered, the client PC 404 receives information (e.g., a photograph, a text and/or a voice mail) related to the current position from the information input device 406 or the keyboard, and transmits the received information to the server 401 after affixing, as search tags, the current position information detected by the position recognizing device 405 and the current time information from the internal clock to the information related to the current position. As a result, the bulletin board corresponding to the current position is registered in the server 401.

Also, in the system of the third embodiment, when the bulletin board corresponding to the current position is registered in the server 401 and new information is additionally written on the bulletin board corresponding to the current position from the client PC 404, the client PC 404 acquires the new information from the information input device 406 or the keyboard, and transmits the acquired information to the server 401 after affixing, as search tags, the current position information detected by the position recognizing device 405 and the current time information from the internal clock to the information related to the current position. As a result, the server 401 adds or updates the new information related to the current position to or on the bulletin board corresponding to the current position.

Moreover, in the system of the third embodiment, when the bulletin board registered in the server 401 is retrieved or browsed from the client PC 404, the client PC 404 transmits to the server 401 the current position information detected by the position recognizing device 405 and additional search conditions including a keyword inputted from, e.g., the keyboard, and the current time information from the internal clock. Based on the transmitted current position information and additional search conditions, the server 401 retrieves the target bulletin board from the hard disk 402 and transmits information of the retrieved bulleting board to the client PC 404.

Figure 22:
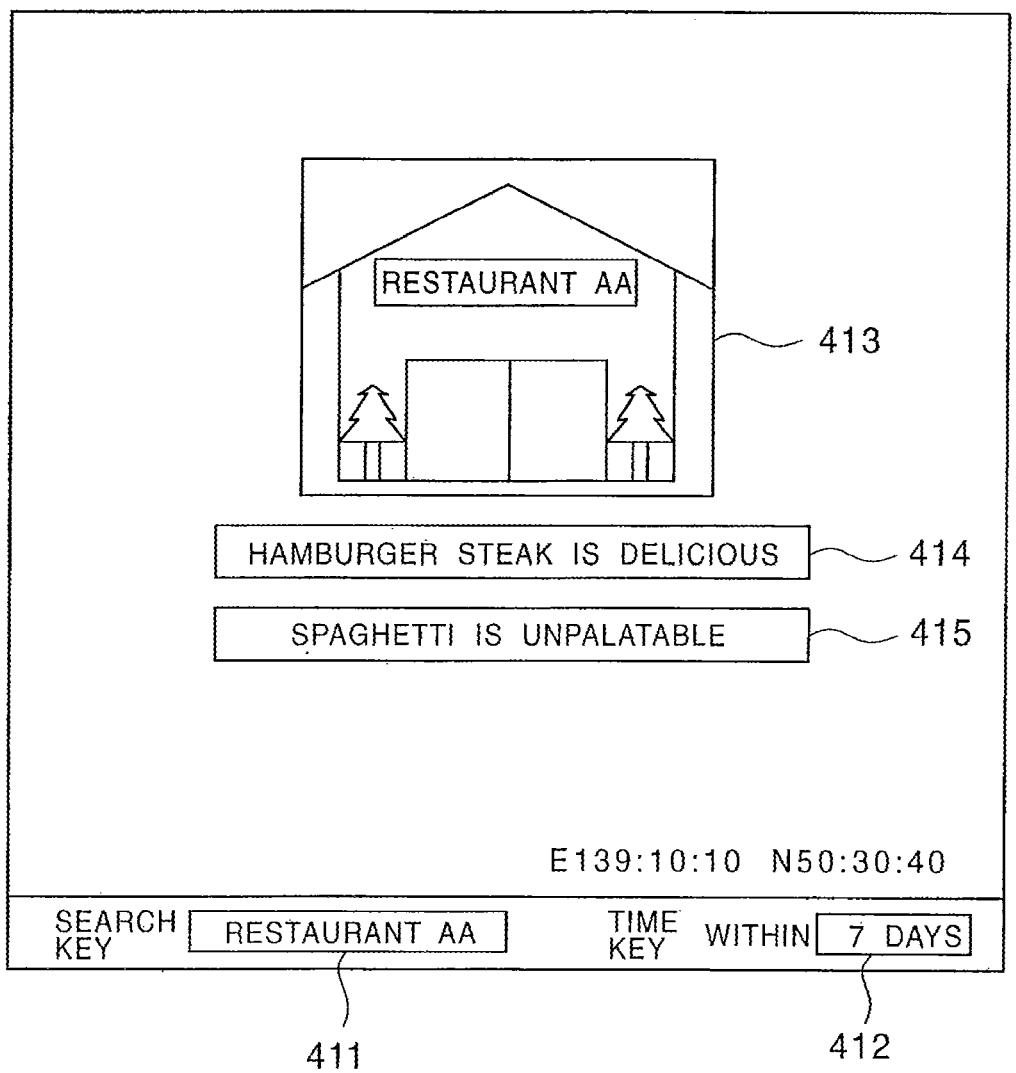
FIG. 22 is a representation showing one example of a display screen image of a bulletin board retrieved using the specific name of some restaurant as a search condition at the current position.

FIG. 22 shows one example of a bulletin board transmitted from the server 401 (i.e., one example of a display screen image on the client PC 404) when the current position is in front of some restaurant having the specific name of "Restaurant AA," for example, and information instructing the name of "Restaurant AA" and the bulletin board being created within "7 days" from the current time is inputted as the additional search conditions from the client PC 404. The display screen image of FIG. 22 is shown by way of example and the present invention is not limited to the illustrated one.

The display screen image of FIG. 22 includes a search key entry field 411 in which an additional search condition related to the position is inputted, and a time key entry field 412 in which a desired period of time from the current time (date and time) is inputted as another additional search condition. When "Restaurant AA" is inputted as a keyword in the search key entry field 411 and "7 days" is inputted as a keyword in the time key entry field 412, a photograph 413 of the Restaurant AA and texts 414, 415 (e.g., "Hamburger steak is delicious" and "Spaghetti is unpalatable") related to comments about the Restaurant AA are displayed as one example of the bulletin board transmitted from the server 401 corresponding to the inputted keywords.

FIG. 22 shows an example of the display screen image when a search is run by inputting a specific keyword, such as "Restaurant AA," at the current position and the bulletin board for "Restaurant AA" was already registered in the past in relation to the current position. It is however very rare that the current position completely coincides with the position at which some bulletin board was registered in the past. For this reason, when a search is run in the system according to the third embodiment of the present invention, bulletin boards matching the additional search conditions are also retrieved from among the bulletin boards which have been already registered at respective positions near the current position. In such a case, it is desired in the example of FIG. 22 that the distance and direction from the current position to "Restaurant AA" are indicated on the display screen image simultaneously. Further, when a search is run by inputting, as a specific keyword, a general name, e.g., "restaurant," a number of bulletin boards which are associated with "restaurant" and have been already registered at respective positions near the current position are retrieved.

Figure 23:
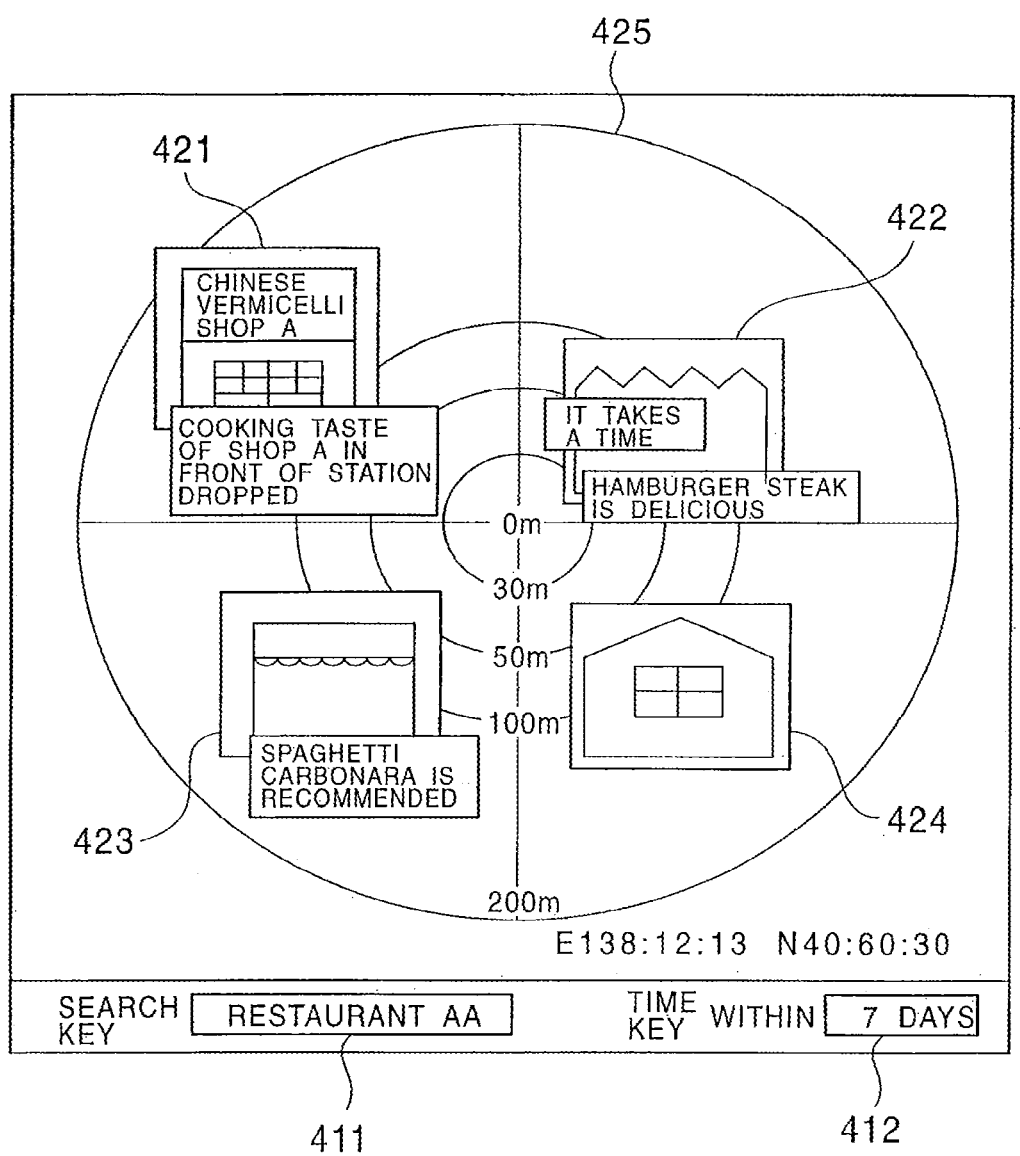
FIG. 23 is a representation showing one example of a display screen image of a bulletin board retrieved from bulletin boards at respective positions near the current position in match with additional search conditions.

FIG. 23 shows one example of a display screen image when bulletin boards matching with the additional search conditions are retrieved by the server 401 from among the bulletin boards corresponding to respective positions near the current position as described above, and the bulletin boards corresponding to the nearby positions are displayed on the display screen of the client PC 404. The display screen image of FIG. 23 is shown by way of example and the present invention is not limited to the illustrated one.

Referring to FIG. 23, the display screen image on the client PC 404 includes a distance scale 425 having the center O corresponding to the current position and indicating the distance from the center O (the current position), as well as the search key entry field 411 and the time key entry field 412. In the example of FIG. 23, when a general name, e.g., "restaurant," is inputted as a keyword in the search key entry field 411 and "7 days" is inputted as a keyword in the time key entry field 412, bulletin boards 421, 422, 423 and 424 matching those additional search conditions are found from among a number of bulletin boards which have already been registered at respective positions near the center O (the current position). The bulletin boards 421, 422, 423 and 424 are then displayed on the display screen of the client PC 404 as shown in FIG. 23. While the distance within the radius of 200 m from the center O is set as a search range in the example of FIG. 23, the search range may be set to a larger or smaller distance.

With the third embodiment of the present invention, as described above, when the bulletin board corresponding to the current position is retrieved, a number of bulletin board corresponding to the current position and nearby positions are also obtained. Therefore, the user can browse, for example, opinions of other persons who visited the respective positions in the past.

When running a BBS search as described above, filtering of bulletin boards can also be performed based on other attendant information (e.g., time, creator, and keyword explicitly attached to the bulletin board). One example of filtering based on time is as follows. By registering photographs and messages about climbing of Mt. Fuji, for example, as a bulletin board in the server, the user can retrieve the bulletin board, which includes the desired photograph, with such an additional search condition as "prospect seen from the same place in winter" when the user climbs Mt. Fuji in summer. This makes the user's experience of mountain climbing more plentiful. In streets as another example, the user can attach such information as "impression of this restaurant" to the bulletin board corresponding to each restaurant or shop, and can browse the bulletin boards corresponding to the respective restaurants or shops. Therefore, users can form a useful set of guide book information while also participating themselves.

Figure 24:
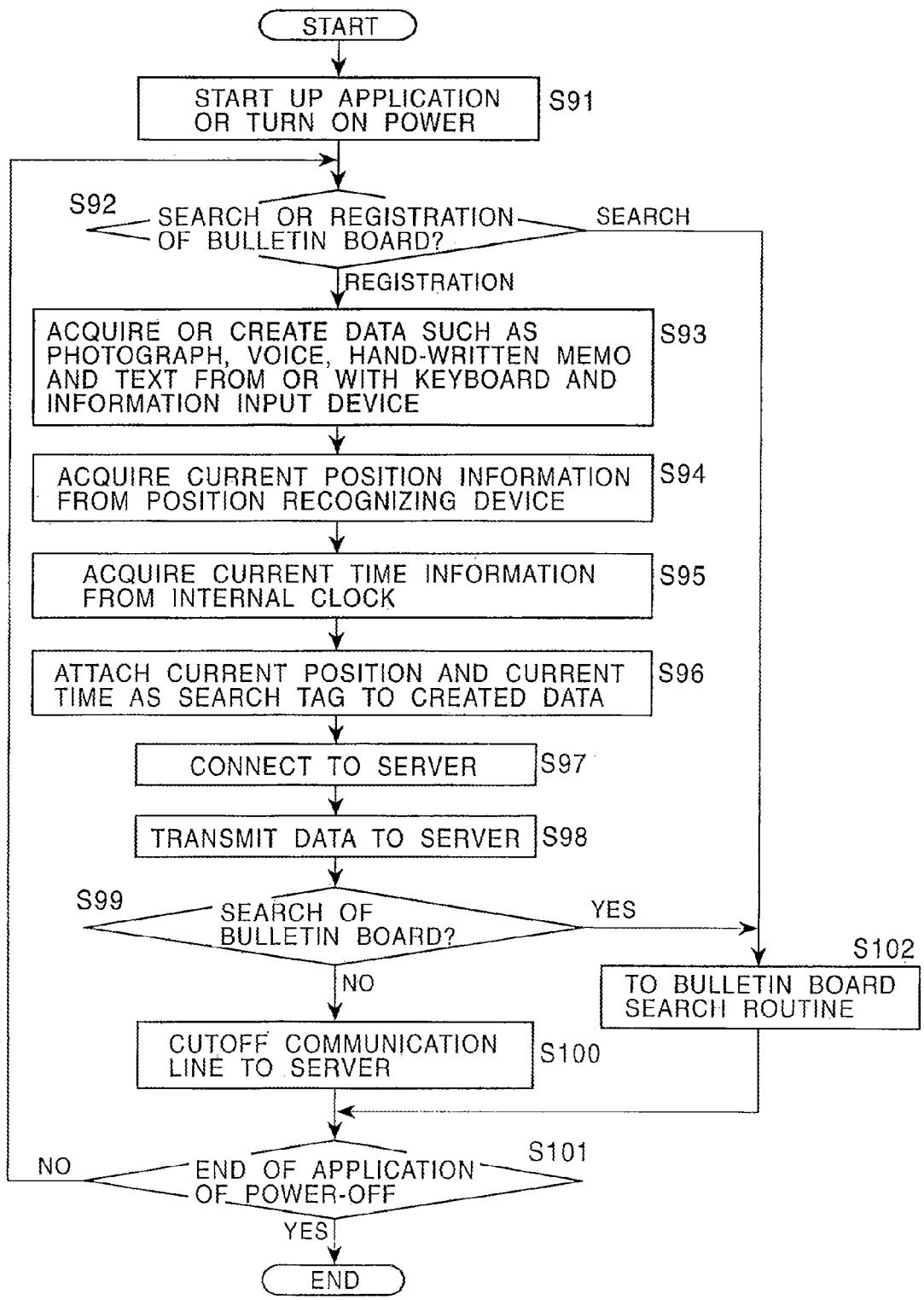
FIG. 24 is a flowchart showing a process flow for new registration of a bulletin board related to the current position.
Figure 25:
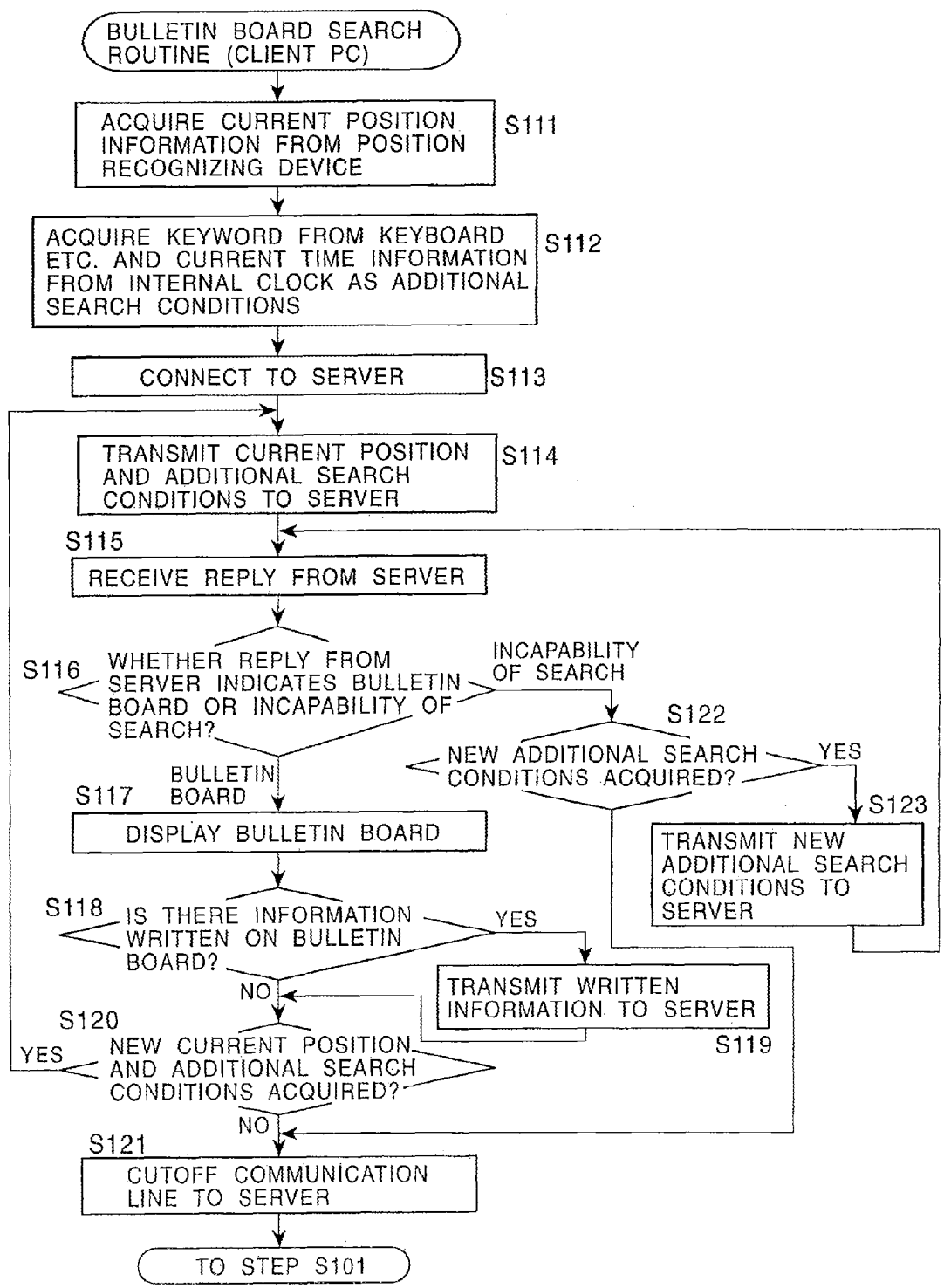
FIG. 25 is a flowchart showing a process flow for, e.g., retrieval and browsing of and writing on a bulletin board corresponding to the current position.

FIGS. 24 and 25 show process flows when on the side of the client PC 404 in the system of the third embodiment, a bulletin board containing information related to the current position is newly registered, and, for example, retrieval and browsing of and writing on a bulletin board already registered corresponding to the current position are performed. Specifically, FIG. 24 primarily shows the process flow for new registration of a bulletin board, and FIG. 25 primarily shows the process flow for, e.g., retrieval and browsing of and writing on a bulletin board. The process flows of FIGS. 24 and 25 are shown by way of example and the present invention is not limited to the illustrated ones.

Referring to FIG. 24, in step S91, the client PC 404 first starts application software for executing registration, retrieval, etc. of a bulletin board corresponding to the current position in the third embodiment described above. In the third embodiment, since a personal computer (the client PC 404 in FIG. 21) is employed as one example of the user terminal, the application software is started to execute registration, retrieval, etc. of a bulletin board corresponding to the current position in step S91. However, if the user terminal is a dedicated device for exclusively executing registration, retrieval, etc. of a bulletin board corresponding to the current position, the dedicated device is powered on in step S41.

When the application software is started in step S91, the client PC 304 determines in step S92 whether an instruction from the user indicates new registration or retrieval of a bulletin board. If it is determined in step S92 that retrieval of a bulletin board is instructed, the process flow goes to step S102 for shift to a bulletin board search (BBS search) routine shown in FIG. 25. On the other hand, if it is determined in step S92 that new registration of a bulletin board is instructed, the process flow goes to steps subsequent to S93.

In step S93, the client PC 404 acquires or creates data, such as a photograph, a voice, a hand-written memo and/or a text, from the information input device or using the keyboard. The data may be created by or acquired from another application.

Further, the client PC 404 acquires current position information from the position recognizing device in step S94 and current time (date and time) information from the internal clock in step S95. Thereafter, in step S96, the client PC 404 adds the current position information and the current time information acquired respectively in steps S94 and S95, as search tags, to the data acquired or created in step S93.

Then, the client PC 404 establishes a connection to the server 401 in step S97, and transmits the data along with the search tags affixed to it to the server 401 in step S98. As a result, the bulletin board corresponding to the current position is newly registered in the server 401.

After that, the client PC 404 determines in step S99 whether a bulletin board search is instructed from the user. If it is determined in step S99 that a bulletin board search is instructed, the process flow goes to step S102 for shift to the bulletin board search routine shown in FIG. 25. On the other hand, if it is determined in step S99 that a bulletin board search is not instructed, the processing in the client PC 404 goes to step S100.

If cutoff of the communication line is instructed from the user, the client PC 404 cuts off the communication line between itself and the server 401 in step S100. After cutoff of the communication line in step S100, it is determined in step S101 whether the application has been brought into end or the power has been turned off. If it is determined that neither the application has been brought into end nor the power has been turned off, the process flow returns to step S92. If it is determined that the application has been brought into end or the power has been turned off, the processing shown in the flowchart of FIG. 24 is ended. In the flowchart of FIG. 24, the communication line between the server 401 and the client PC 404 is connected at the time of starting transmission of the data and the search tags to the server 401, and the communication line is cut off upon an instruction from the user to cut it off. However, the client PC 404 may be kept always connected to the server 401.

If the process flow goes to step S102 upon such a determination in step S92 of FIG. 24 that new registration of a bulletin board is instructed, the client PC 404 acquires current position information from the position recognizing device in step S111 in FIG. 25, and then acquires, as additional search conditions, a keyword from, e.g., the keyboard and current time (date and time) information from the internal clock in step S112.

Subsequently, the client PC 404 establishes a connection to the server 401 in step S113, and transmits the current position and the additional search conditions in step S114, followed by receiving a reply from the server 401 in step S115.

It is here that the reply from the server 401 is provided as either a bulletin board retrieved based on the current position and the additional search conditions both transmitted from the client PC 404, or a message, for example, issued in the case that a search has ended in failure.

Accordingly, the processing in the client PC 404 advances to steps subsequent to S117 if it is determined in step S116 that the reply from the server 401 is information of a bulletin board, and to steps subsequent to S122 if it is determined in step S116 that the reply from the server 401 is a message, for example, indicating a search failure.

If it is determined in step S116 that the reply from the server 401 indicates a search failure, the client PC 404 determines in step S122 whether a new additional search condition has been acquired. If it is determined that a new additional search condition has not been acquired, the processing of the client PC 404 advances to step S121. If it is determined that a new additional search condition has been acquired, the processing of the client PC 404 advances to step S123 in which the new additional search condition is transmitted to the server 401, followed by returning to step S115.

On the other hand, if it is determined in step S116 that the reply from the server 401 is information of a bulletin board, the client PC 404 displays one or more bulletin boards (corresponding to the current position or nearby positions as described above) transmitted from the server 401 on the display screen in step S117.

Then, the client PC 404 determines in step S118 whether there is any information to be written on the bulletin board. If there is any information to be written, the client PC 404 transmits the written information to the server 401 in step S119. After the completion of step S119, the processing in the client PC 404 advances to step S120.

If it is determined in step S118 that there is no information to be written on the bulletin board, the processing in the client PC 404 advances to step S120.

In step S120, the client PC 404 determines whether there is an input of a new current position and additional search condition. If it is determined in step S120 that a new current position and additional search condition are inputted, the processing in the client PC 404 returns to step S114 in which the new current position and additional search condition are transmitted to the server 401. On the other hand, if it is determined in step S120 that a new current position and additional search condition are not inputted, the process flow goes to step S121.

If a new current position and additional search condition are not inputted in step S120 and cutoff of the communication line is instructed from the user, the client PC 404 cuts off the communication line between itself and the server 401 in step S121. After cutoff of the communication line in step S121, the process flow goes to step S101 in FIG. 24. If it is determined in step S101 that the application has been brought into end or the power has been turned off, the processing is ended. If it is determined in step S101 that neither the application has been brought into end nor the power has been turned off, the process flow returns to step S92 in FIG. 24 in which the client PC 404 waits for an instruction of a retrieval or new registration of a bulletin board. In the flowchart of FIG. 25, the communication line between the server 401 and the client PC 404 is connected at the time of starting transmission of the current position and the additional search conditions to the server 401, and the communication line is cut off upon an instruction from the user to cut off it. However, the client PC 404 may be kept always connected to the server 401.

Figure 26:
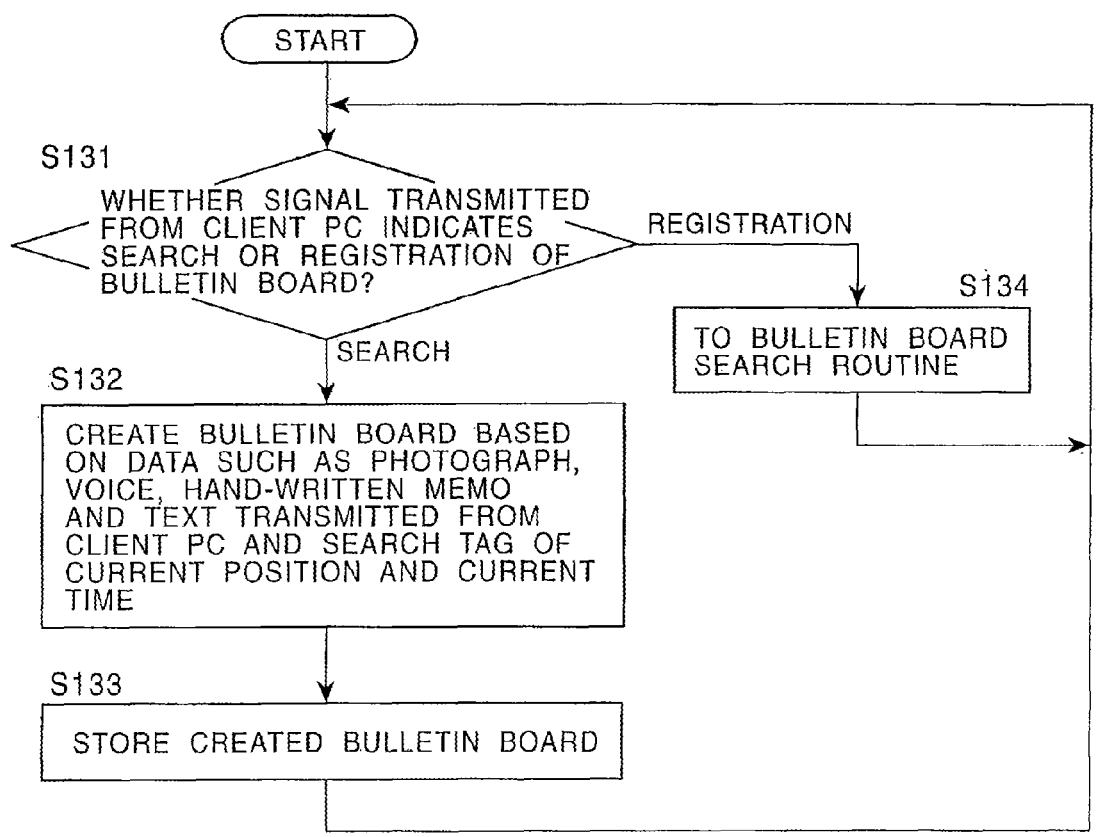
FIG. 26 is a flowchart showing a process flow on the server side when new registration of a bulletin board corresponding to the current position is requested from the client PC.
Figure 27:
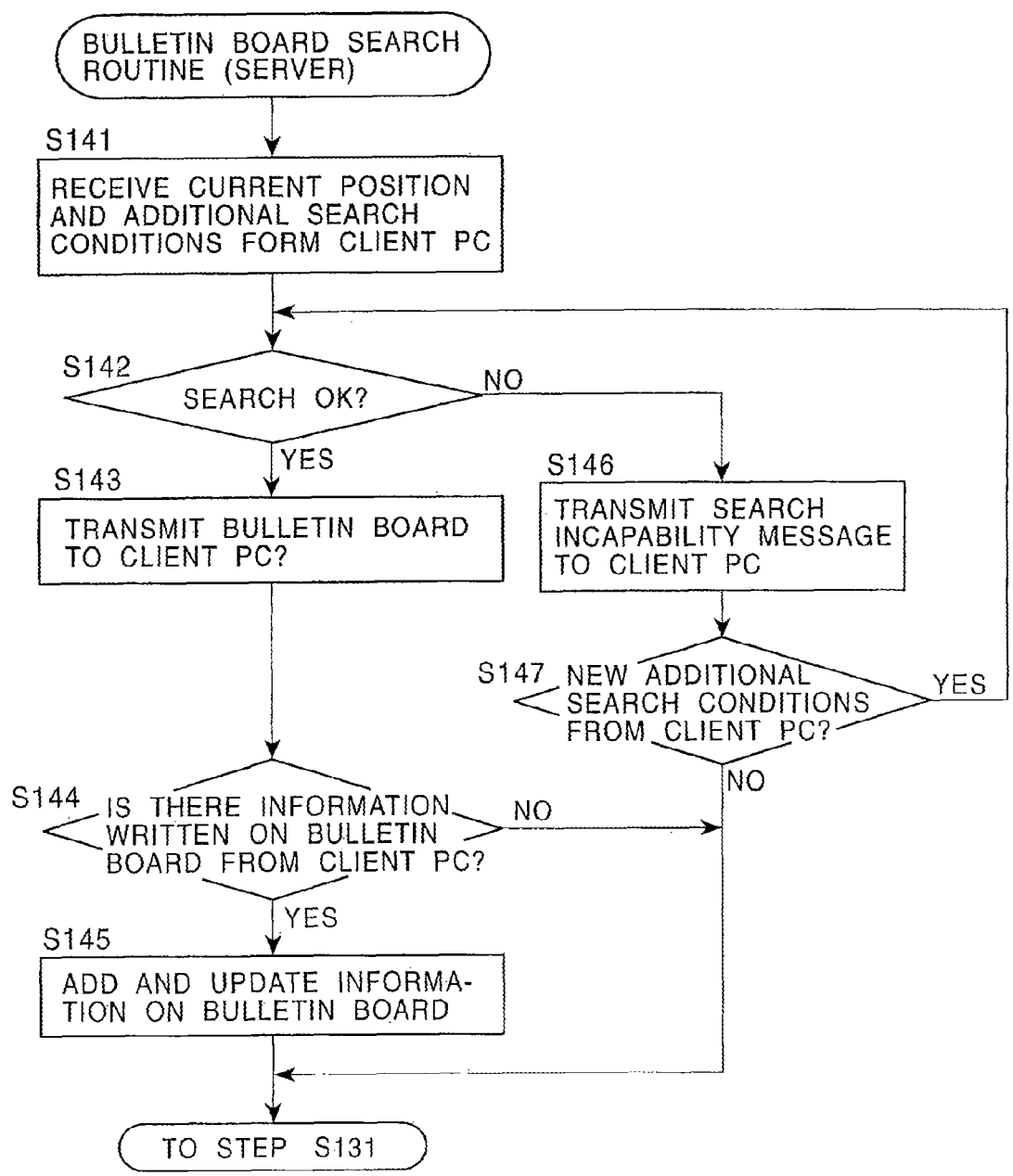
FIG. 27 is a flowchart showing a process flow for, e.g., retrieval and browsing of and writing on a bulletin board in relation to the current position.

FIGS. 26 and 27 show process flows when on the side of the server 401 in the system of the third embodiment, a request for retrieval of a bulletin board or data for new registration of a bulletin board is transmitted from the client PC 404, and retrieval or new registration of a bulletin board is run correspondingly. Specifically, FIG. 26 primarily shows the process flow for new registration of a bulletin board, and FIG. 27 primarily shows the process flow for retrieval of a bulletin board, etc. The process flows of FIGS.

26 and 27 are shown by way of example and the present invention is not limited to the illustrated ones.

Referring to FIG. 26, as shown in step S131, the server 401 is always held in a state of waiting for a request for retrieval of a bulletin board or data for new registration of a bulletin board from the client PC 404. If it is determined in step S131 that a request for retrieval of a bulletin board is transmitted from the client PC 404, the process flow goes to step S134 for shift to a bulletin board search routine shown in FIG. 27. On the other hand, if it is determined in step S131 that data for new registration of a bulletin board is transmitted from the client PC 404, the process flow goes to steps subsequent to S132.

In step S132, the server 401 creates a bulletin board corresponding to the data, such as a photograph, a voice, a hand-written memo and/or a text, transmitted from the client PC 404, as well as the search tags, i.e., the current position and the current time (date and time), affixed to the data.

Then, in step S133, the server 401 stores the thus-created bulletin board in the hard disk 402. The registration process of a new bulletin board is thereby completed. After step S133, the server 401 returns to the state of waiting for reception of a signal in step S131.

If the process flow goes to step S134 upon such a determination in step S131 of FIG. 26 that new registration of a bulletin board is instructed, the server 401 receives, in step S141 of FIG. 27, the current position and the additional search conditions both transmitted from the client PC 404.

After receiving the current position and the additional search conditions from the client PC 404, the server 401 searches in step S142 the bulletin boards, which are stored in the hard disk 402, for one matching the current position and the additional search conditions. If a bulletin board in match with the current position and the additional search conditions is found out by the search in step S142, the processing in the server 401 advances to steps subsequent to S143, whereas if not found out, the processing in the server 401 advances to steps subsequent to S146.

If it is determined in step S142 that the search has finished successfully, the server 410 transmits the found-out bulletin board to the client PC 404 in step S143.

Then, the server 401 determines in step S144 whether there is any information written on the bulletin board from the client PC 404. If any information is written, the server 401 adds the written information to the bulletin board or updates the bulletin board with the written information in step S145, followed by returning to step S131 in FIG. 26.

On the other hand, if it is determined in step S142 that the search has ended in failure, the server 410 transmits a search failure message, for example, to the client PC 404. Thereafter, if a new additional search condition is received from the client PC 404 in step S147, the server 401 runs a search again in step S142 using the new additional search condition. If a new additional search condition is not transmitted, the process flow returns to step S131 in FIG. 26.

When position recognition is performed by utilizing the PHS in the third embodiment of the present invention, one conceivable method is to calculate the latitude and the longitude based on the principles of triangular surveying by using the intensities of electric fields generated from base stations whose positions are known. As another method, it is also conceivable to employ, as a "position" of convenience, an ID of the base station generating an electric field with the maximum intensity, or to employ, as a "position" of convenience, a pair of base station ID and electric field intensity (possibly plural pairs depending upon cases). The reason why the term "of convenience" is used here is that there is no direct relation between the base station ID and the latitude and longitude. In the third embodiment of the present invention, since it is enough to be able to determine whether "positions" corresponding to registered new bulletin boards are close to each other, absolute position information is not necessarily required.

In the method of employing, as a "position" of convenience, a pair of base station ID and electric field intensity, a "distance" of convenience can be calculated with similarity calculation made between one pair and another pair of base station ID and electric field intensity which is observed later. A computing process shown in FIG. 28, by way of example, can be used as a similarity determining algorithm for executing the similarity calculation. The computing process shown in FIG. 28 corresponds to calculation of correlation coefficients among a set of base station IDs/electric field intensities. Additionally, in FIG. 28, IDi represents the ID of the i-th base station, Fi represents the electric field intensity of the i-th base station, and d represents the "distance" of convenience between [IDi, Fi] (i=1, 2, . . . , n) and [ID'j, F'j] (j=1, 2, . . . , m).

Figure 28:
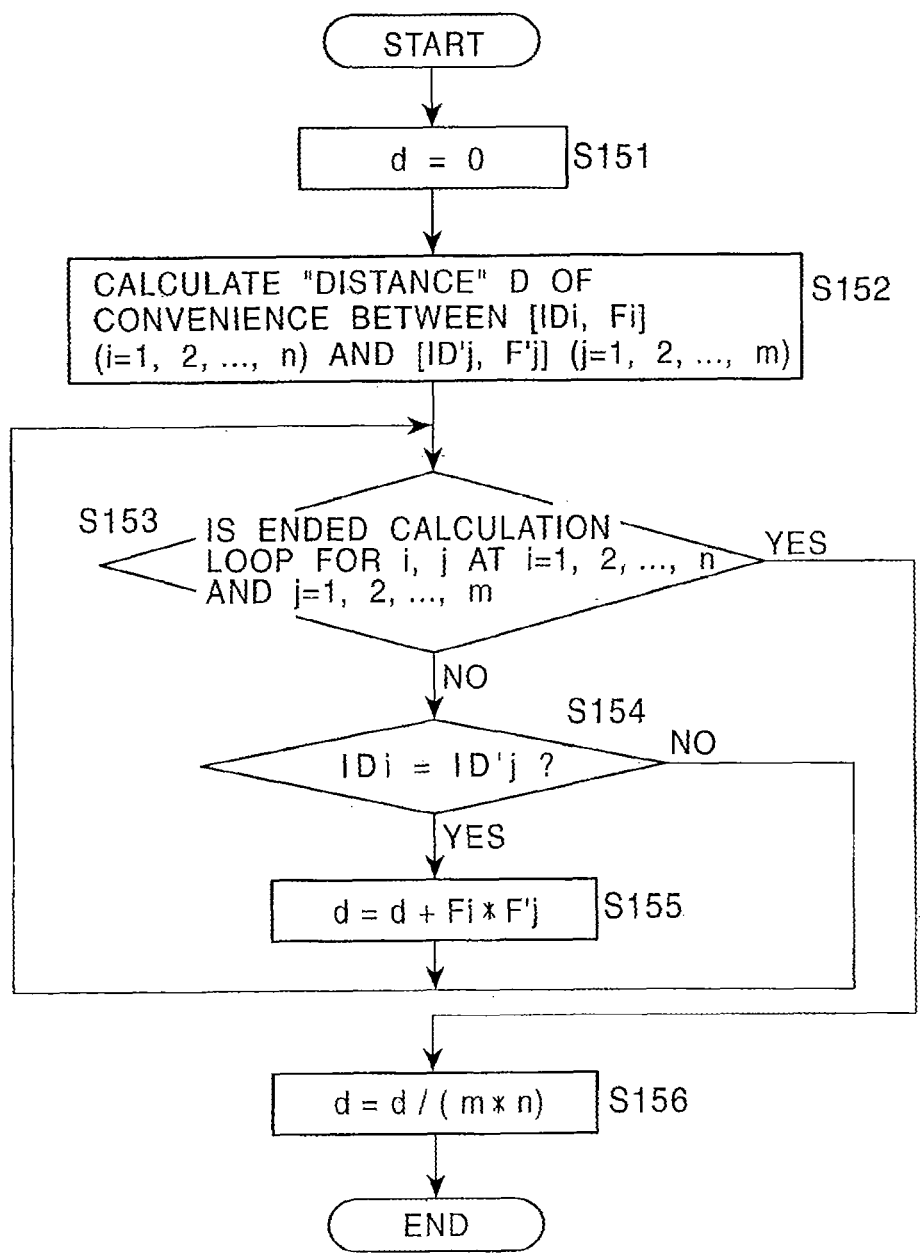
FIG. 28 is a flowchart showing a similarity determining algorithm in a method of using, as a "position" of convenience, a pair of base station ID and electric field intensity when position recognition is carried out using the PHS.

Referring to FIG. 28, the client PC 404 first initializes a variable "distance d" to zero (0) in step S151, and starts calculating the "distance d" of convenience between [IDi, Fi] (i=1, 2, . . . , n) and [ID'j, F'j] (j=1, 2, . . . , m) in step S152.

After starting the calculation, the client PC 404 determines in step S153 whether a calculation loop for i, j at i=1, 2, . . . , n and j=1, 2, . . . , m is completed. If it is determined in step S153 that the calculation loop is not yet completed, the client PC 404 determines in step S154 whether IDi=ID'j is satisfied. If it is determined in step S154 that IDi=ID'j is not satisfied, the process flow returns to step S153, whereas if it is determined that IDi=ID'j is satisfied, the process flow returns to step S153 after setting d=d+Fi*F'j in step S155.

Then, it is determined in step S153 that the calculation loop is completed, the client PC 404 sets d=d/(m*n) and obtains the distance d.

While the above-described third embodiment utilizes the GPS or PHS for detecting a position, it is also possible to utilize, e.g., traffic information beacons which have been recently installed for a traffic information providing system, or an IR beacon used in the first embodiment for the same purpose.

Additionally, a providing medium for providing a computer program for executing the above processes in the third embodiment to users includes not only an information recording medium such as a magnetic disk or CD-ROM, but also a transmission medium in the form of a network employing the Internet or digital satellites.

It is to be noted that the term "system" used in the third embodiment implies an overall facility made up of a number of devices, units and the like.

Figure 29:
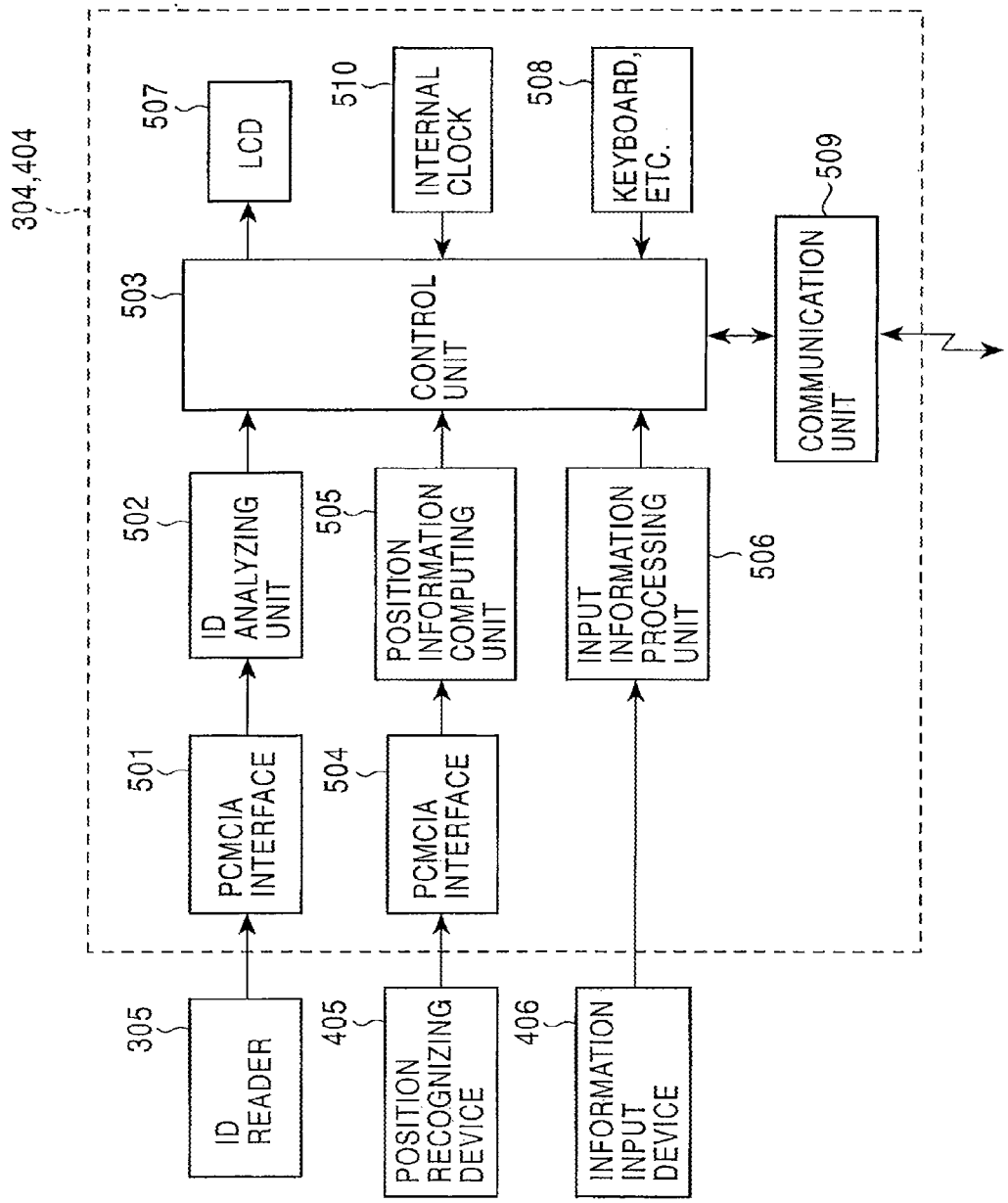
FIG. 29 is a block circuit diagram showing one example of concrete configuration of principal parts of client PCs (304, 404) applicable to the second and third embodiments.
Figure 30:
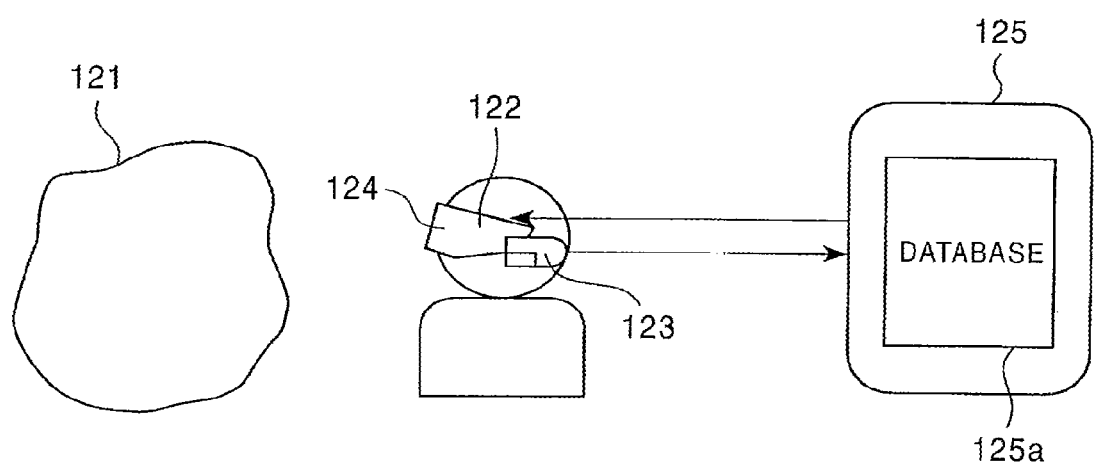
FIG. 30 is an illustration for explaining the concept of conventional Augmented Reality.

FIG. 29 shows one example of a concrete configuration of principal parts of client PCs (304, 404) applicable to the second and third embodiments.

Referring to FIG. 29, an ID taken in by the ID reader 305 such as a bar code reader is supplied to an ID analyzing unit 502 via a PCMCIA interface 501. The ID analyzing unit 502 analyzes the supplied ID, and then supplies the analyzed ID data to a control unit 503.

A position signal detected by the position recognizing device 405 such as utilizing the GPS or PHS is supplied to a position information computing unit 505 via a PCMCIA interface 504. The position information computing unit 505 computes, from the supplied signal, the current altitude and longitude (in the case utilizing the GPS) or position-ofconvenience information (in the case utilizing the PHS) based on base station IDs, and then supplies the computed current position data to the control unit 503.

Data such as a photograph, a voice and/or a hand-written memo is inputted from the information input device 406, and the input data is supplied to an input information processing unit 506. The input information processing unit 506 processes the input data depending upon the types of data (such as a photograph, a voice or a hand-written memo), and then supplies the processed data to the control unit 503.

Other data, e.g., a text or a keyword as a search condition, is entered from a keyboard, etc. 508, and an internal clock 510 generates data of current time (date and time). The data from the keyboard, etc. 508 and the data from the internal clock 510 are also supplied to the control unit 503.

The control unit 503 creates a URL necessary for accessing the server based on the supplied ID data as described above in the second embodiment, or information necessary for retrieval of a bulletin board corresponding to a position, registration of a new bulletin board, etc. based on the input data, the keyword, the current time data, etc. as described above in the third embodiment. Further, the control unit 503 creates a display signal for providing a screen image on an LCD (liquid crystal display) 507 as a display unit, and transmits or receives data to or from the server, etc. via a communication unit 509 which serves as a device for connection to the modem or the wireless network.

With the second and third embodiments of the present invention, as described above, since information can be easily exchanged using bulletin boards corresponding to an object and position in the real world, the user can obtain the latest information about a certain object and position, and can easily inform other users of new information. Also, with the second and third embodiments of the present invention, the present system can also be utilized as an information system for presenting product support information, advertisement information about a particular place, and so on. Moreover, links (such as advertisements of associated products or shops) related to an object or position corresponding to some bulletin board can be additionally displayed on the bulletin board. Thus, the system of the present invention is also valuable as an advertisement medium for distributing information to a community of users who are interested in a certain object or position.

According to the information processing apparatus and method, the information processing system, and the providing medium of the present invention, as fully described above, since attached information is inputted as corresponding to specific information specifying a situation in the real world, the attached information can be virtually attached to the situation in the real world. Also, the attached information is information that is related to the situation in the real world and can be browsed and exchanged among users. According to the present invention, therefore, information (such as image information, text information and voice information) corresponding to situations (such as a position and an object) in the real world can be presented to users. In addition, users can not only attach the information to the situations in the real world, but also quickly and easily find out desired information.

Further, according to the information processing apparatus and method and the providing medium of the present invention, since attached information is stored in correspondence to a situation in the real world, the information corresponding to the situation in the real world can be provided to users. According to the present invention, therefore, information (such as image information, text information and voice information) corresponding to situations (such as a position and an object) in the real world can be presented to users. In addition, users can not only attach the information to the situations in the real world, but also quickly and easily find out desired information.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-transitory computer readable storage medium storing instructions which, when executed, cause at least one processor in an information processing system to:
   receive optical information relating to a product from a wearable user device at a first location on which a user has started an application for on-line shopping;
   receive attachment information relating to the product, wherein the attachment information relating to the product was input by a different user of the product via an internet interface at a second different location;
   transmit the attachment information relating to the product and a link for on-line shopping corresponding to the product to the wearable user device, which is configured to control a display device to display the attachment information and the link for on-line shopping and access the link for on-line shopping to display an on-line page selling the product,
   wherein the display device is configured to display a screen image including a context-aware area and a personal information tray, wherein the context-aware area corresponds to a real world associated with the wearable user device, and wherein an icon corresponding to the attachment information is configured to be generated in the personal information tray, wherein a drag and drop operation of the icon is configured to be performed on the display device, wherein the icon is configured to be dragged from a first position in the personal information tray and dropped at a second position in the context-aware area, and wherein accessing the icon provides the attachment information.

2. The non-transitory computer readable storage medium of claim 1, wherein a second user inputs second attachment information corresponding to the product via a second internet interface and the second attachment information is transmitted to the information processing system for exchange with a plurality of different users.

3. The non-transitory computer readable storage medium of claim 1, wherein the attachment information is provided by a plurality of different users.

4. The non-transitory computer readable storage medium of claim 1, wherein the information processing system comprises:
   a storage device; and
   a communication device,
   wherein the storage device stores the attachment information relating to the product and the link for on-line shopping corresponding to the product.

5. The non-transitory computer readable storage medium of claim 1, wherein the attachment information is text.

6. The non-transitory computer readable storage medium of claim 1, wherein the attachment information includes a time indicator.

7. The non-transitory computer readable storage medium of claim 1, wherein the optical information includes at least one of barcode information, a numerical identification code, a product ID, a two-dimensional ID, an ISBN code, a JAN code, an EAN code, and a CDDB code.

8. The non-transitory computer readable storage medium of claim 1, wherein the product is at least one of a music medium, a CD, and a book.

9. The non-transitory computer readable storage medium of claim 1, wherein the attachment information includes evaluation information for the product.

10. A non-transitory computer readable storage medium storing instructions which, when executed, cause at least one processor in a wearable user device to:
   start, based on an input by a user to the wearable user device at a first location, an application for on-line shopping;
   receive optical information relating to a product;
   transmit the optical information, from the wearable user device at the first location, to a second information processing apparatus;
   receive attachment information relating to the product and a link for on-line shopping corresponding to the product from a third information processing apparatus which received the attachment information relating to the product, wherein the attachment information relating to the product was input by a different user of the product via an internet interface at a second different location;
   control a display device to display the attachment information and the link for on-line shopping; and
   access the link for on-line shopping to display an on-line page selling the product,
   wherein the display device is configured to display a screen image including a context-aware area and a personal information tray, wherein the context-aware area corresponds to a real world associated with the wearable user device, and wherein an icon corresponding to the attachment information is configured to be generated in the personal information tray, wherein a drag and drop operation of the icon is configured to be performed on the display device, wherein the icon is configured to be dragged from a first position in the personal information tray and dropped at a second position in the context-aware area, and wherein accessing the icon provides the attachment information.

11. The non-transitory computer readable storage medium of claim 10, wherein a second user inputs second attachment information corresponding to the product via a second internet interface and the second attachment information is transmitted to the third information processing apparatus for exchange with a plurality of different users.

12. The non-transitory computer readable storage medium of claim 10, wherein after the application is started, the wearable user device waits to receive the optical information.

13. The non-transitory computer readable storage medium of claim 10, wherein the attachment information is provided by a plurality of different users.

14. The non-transitory computer readable storage medium of claim 10, wherein the wearable user device comprises:
   an optical input device; and
   a communication device.

15. The non-transitory computer readable storage medium of claim 14, wherein the input device is at least one of a bar code reader and a camera.

16. The non-transitory computer readable storage medium of claim 10, wherein the attachment information is text.

17. The non-transitory computer readable storage medium of claim 10, wherein the attachment information includes a time indicator.

18. The non-transitory computer readable storage medium of claim 10, wherein the optical information includes barcode information.

19. The non-transitory computer readable storage medium of claim 10, wherein the optical information includes at least one of a numerical identification code, a product ID, a two-dimensional ID, an ISBN code, a JAN code, an EAN code, and a CDDB code.

20. The non-transitory computer readable storage medium of claim 10, wherein the product is at least one of a music medium, a CD, and a book.

21. The non-transitory computer readable storage medium of claim 10, wherein the attachment information includes evaluation information for the product.

22. A wearable user device comprising:
   at least one processor; and
   a memory device storing instructions which when executed by the at least one processor cause the wearable user device to:
   start, based on an input by a user to the wearable user device at a first location, an application for on-line shopping;
   receive optical information relating to a product;
   transmit the optical information, from the wearable user device at the first location, to a second information processing apparatus;
   receive attachment information relating to the product and a link for on-line shopping corresponding to the product from a third information processing apparatus which received the attachment information relating to the product, wherein the attachment information relating to the product was input by a different user of the product via an internet interface at a second different location;
   control a display device to display the attachment information and the link for on-line shopping; and
   access the link for on-line shopping to display an on-line page selling the product,
   wherein the display device is configured to display a screen image including a context-aware area and a personal information tray, wherein the context-aware area corresponds to a real world associated with the wearable user device, and wherein an icon corresponding to the attachment information is configured to be generated in the personal information tray, wherein a drag and drop operation of the icon is configured to be performed on the display device, wherein the icon is configured to be dragged from a first position in the personal information tray and dropped at a second position in the context-aware area, and wherein accessing the icon provides the attachment information.

23. The wearable user device of claim 22, wherein the attachment information includes evaluation information for the product.

* * * * *